US012154235B2

(12) United States Patent
Jung et al.

(10) Patent No.: US 12,154,235 B2
(45) Date of Patent: *Nov. 26, 2024

(54) MOBILE TERMINAL AND CONTROL METHOD THEREOF

(71) Applicant: LG Electronics Inc., Seoul (KR)

(72) Inventors: Dukyung Jung, Seoul (KR); Kihyung Lee, Seoul (KR); Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,178

(22) Filed: Feb. 21, 2023

(65) Prior Publication Data

US 2023/0196695 A1    Jun. 22, 2023

Related U.S. Application Data

(63) Continuation of application No. 17/278,011, filed as application No. PCT/KR2018/011341 on Sep. 21, 2018, now Pat. No. 11,615,593.

(51) Int. Cl.
*G06T 19/00* (2011.01)
*G01C 21/36* (2006.01)
*G06T 3/40* (2006.01)
*G06V 20/56* (2022.01)
*G08G 1/0968* (2006.01)

(52) U.S. Cl.
CPC .......... *G06T 19/006* (2013.01); *G01C 21/36* (2013.01); *G06T 3/40* (2013.01); *G06V 20/588* (2022.01); *G08G 1/0968* (2013.01); *G06T 2200/24* (2013.01); *G06T 2210/22* (2013.01)

(58) Field of Classification Search
CPC ....... G06T 19/006; G06T 3/40; G06V 20/588; G01C 21/36
USPC ......................................................... 345/419
See application file for complete search history.

(56) References Cited

U.S. PATENT DOCUMENTS

| 10,217,286 B1 | 2/2019 | Angel et al. |
| 10,339,718 B1 | 7/2019 | Kamal et al. |
| 10,789,490 B2 * | 9/2020 | Kleen .................... G06V 20/20 |

(Continued)

FOREIGN PATENT DOCUMENTS

| CN | 101595368 | 12/2009 |
| CN | 102692234 | 9/2012 |

(Continued)

OTHER PUBLICATIONS

Extended European Search Report in European Appln. No. 18933925.2, mailed on Apr. 5, 2022, 9 pages.

(Continued)

*Primary Examiner* — Javid A Amini
(74) *Attorney, Agent, or Firm* — Fish & Richardson P.C.

(57) ABSTRACT

Disclosed is a mobile terminal that provides an augmented reality navigation screen in a state of being hold in a vehicle, the mobile terminal including: at least one camera configured to obtain a front image; a display; and at least one processor configured to calibrate the front image, and to drive an augmented reality navigation application so that the augmented reality navigation screen including at least one augmented reality (AR) graphic object and the calibrated front image is displayed on the display.

10 Claims, 21 Drawing Sheets

(56) References Cited

U.S. PATENT DOCUMENTS

| | | | |
|---|---|---|---|
| 11,615,593 B2* | 3/2023 | Jung | G01C 21/3626 345/419 |
| 2005/0203367 A1 | 9/2005 | Ahmed et al. | |
| 2011/0153198 A1 | 6/2011 | Kokkas et al. | |
| 2011/0175569 A1 | 7/2011 | Austin | |
| 2012/0226437 A1 | 9/2012 | Li et al. | |
| 2013/0293582 A1 | 11/2013 | Ng-Thow-Hing et al. | |
| 2013/0321629 A1 | 12/2013 | Zhang et al. | |
| 2015/0049080 A1 | 2/2015 | Purayil et al. | |
| 2015/0145951 A1 | 5/2015 | Ko | |
| 2017/0042631 A1 | 2/2017 | Doo et al. | |
| 2017/0315771 A1 | 11/2017 | Kerr | |
| 2018/0089899 A1* | 3/2018 | Piemonte | G01C 21/365 |
| 2019/0172250 A1 | 6/2019 | Nam et al. | |
| 2019/0188912 A1* | 6/2019 | Kamini | G06F 3/017 |
| 2020/0170564 A1 | 6/2020 | Jiang et al. | |
| 2021/0272363 A1 | 9/2021 | Nguyen et al. | |

FOREIGN PATENT DOCUMENTS

| | | |
|---|---|---|
| KR | 2014-0054909 | 5/2014 |
| KR | 2016-0146384 | 12/2016 |
| KR | 2017-0016700 | 2/2017 |
| WO | WO 2016/188547 | 12/2016 |

OTHER PUBLICATIONS

Gupta et al., "Small obstacle detection using stereo vision for autonomous ground vehicle" Krishnam Gupta et al., DOI: https://doi.org/10.1145/3132446.3134889, 2017, 6 pages.

International Search Report in International Appln. No. PCT/KR2018/011341, mailed on Jun. 20, 2019, 5 pages (with English translation).

Office Action in Chinese Appln. No. 201880099670.X, mailed on Jan. 6, 2022, 15 pages (with English translation).

Office Action in Korean Appln. No. 10-2021-7008117, mailed on Nov. 22, 2022, 10 pages (with English translation).

Song et al., "Real-Time Obstacles Detection and Status Classification for Collision Warning in a Vehicle Active Safety System", IEEE Transactions on Intelligent Transportation Systems, vol. 19, No. 3, Mar. 2018, 16 pages.

* cited by examiner

[FIG. 1]
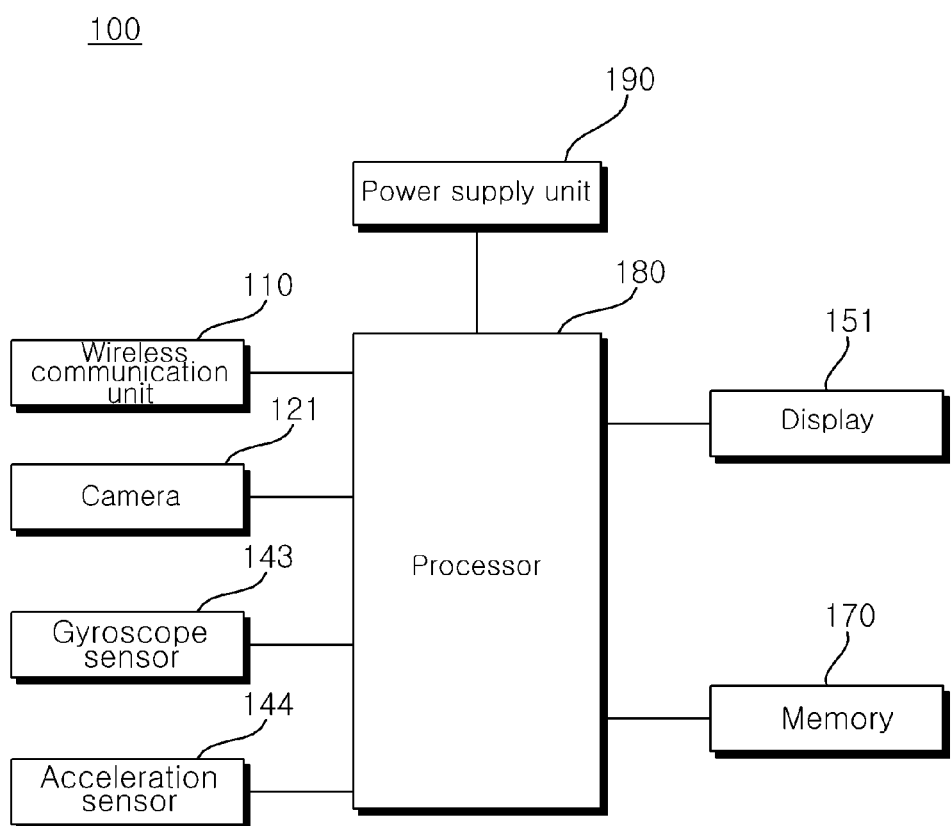

[FIG. 2]
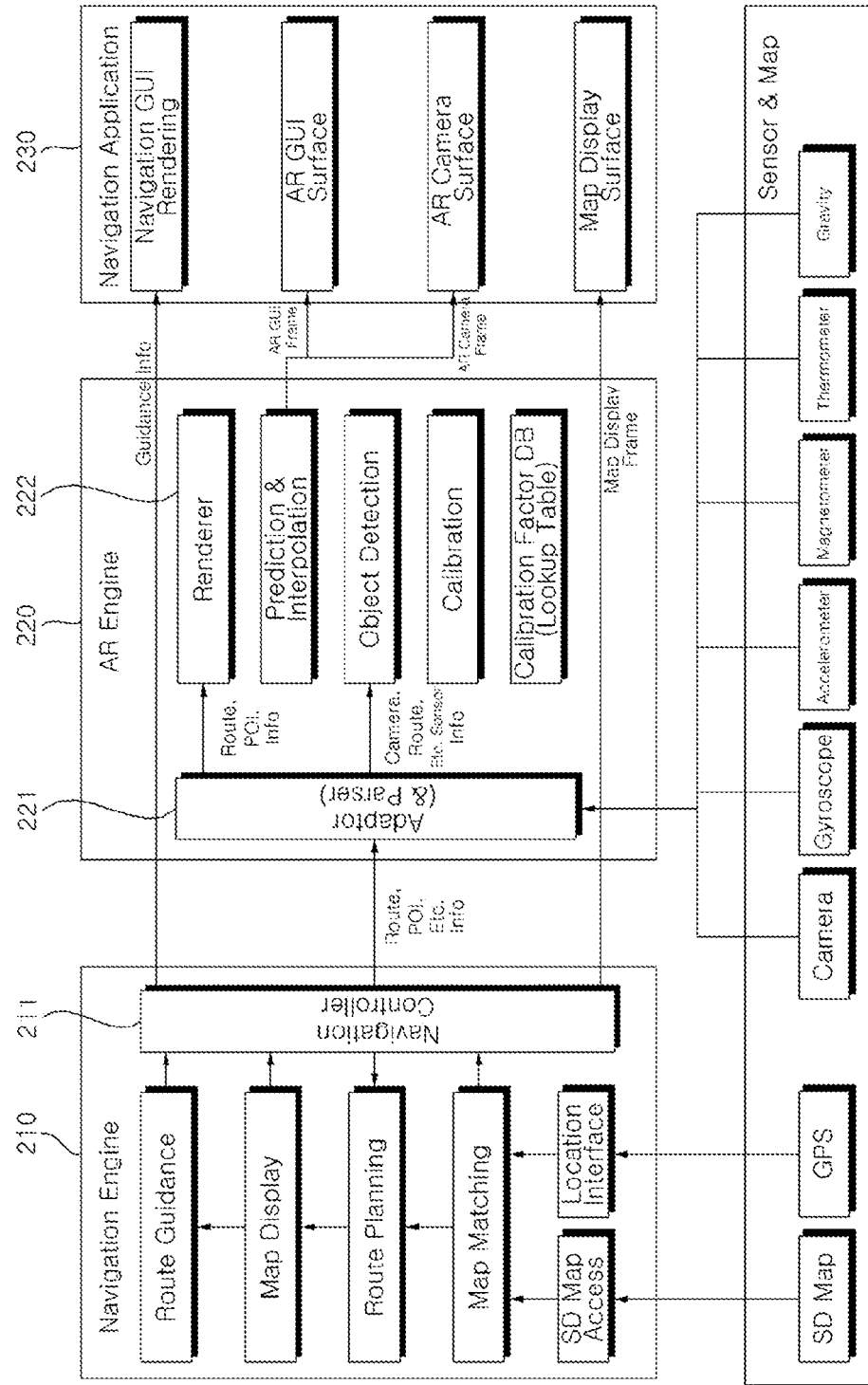

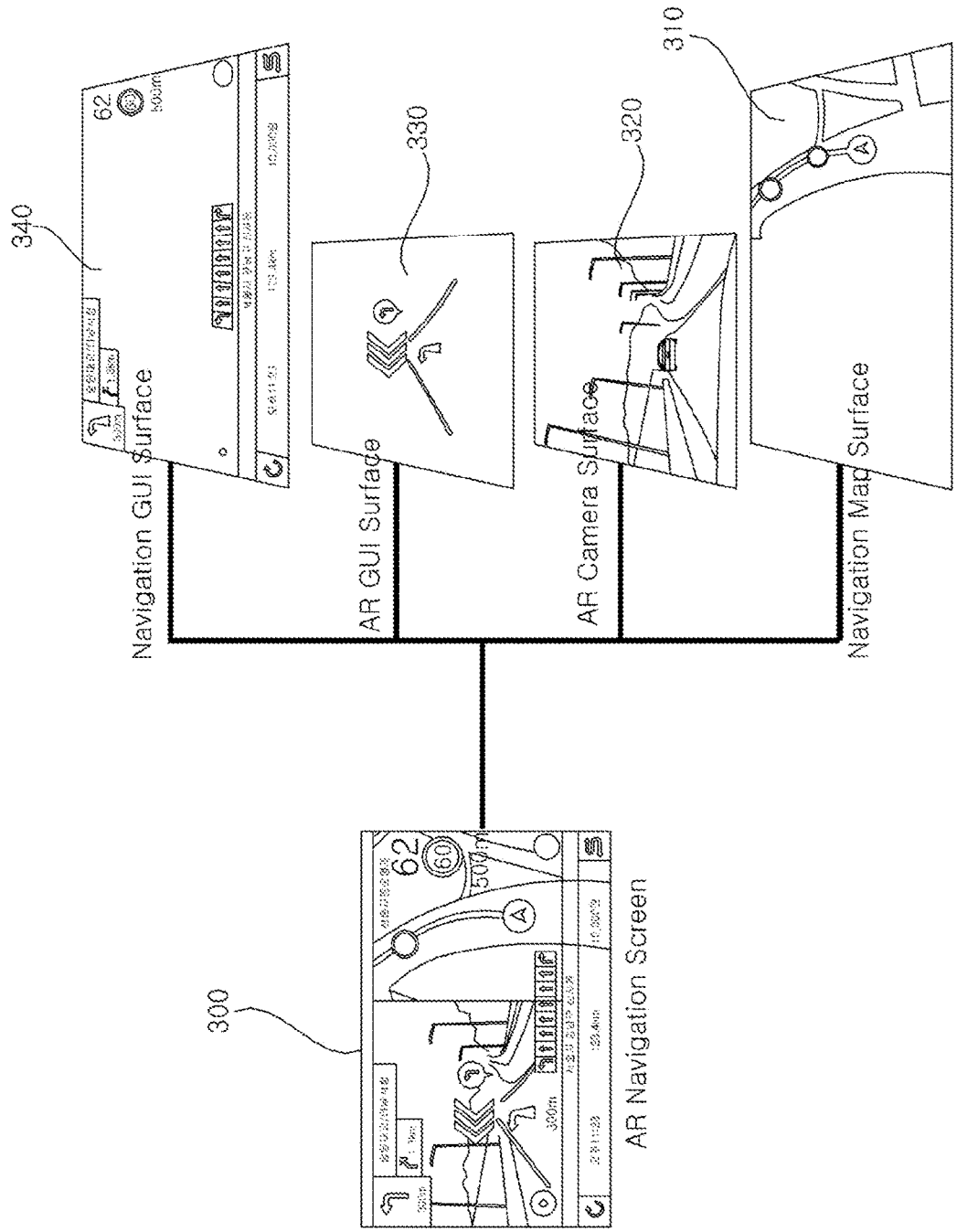
[FIG. 3]

[FIG 4]
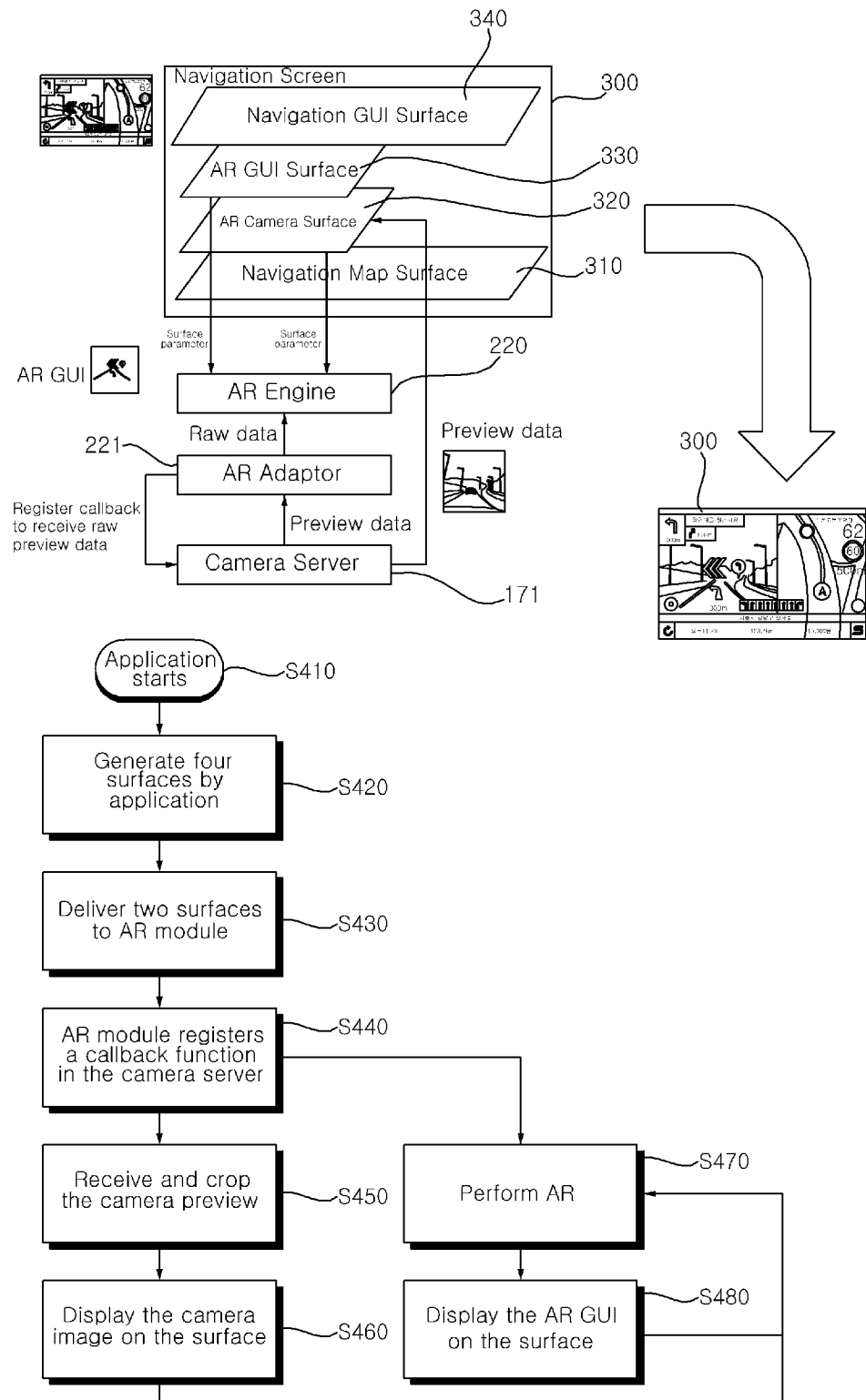

[FIG 5]
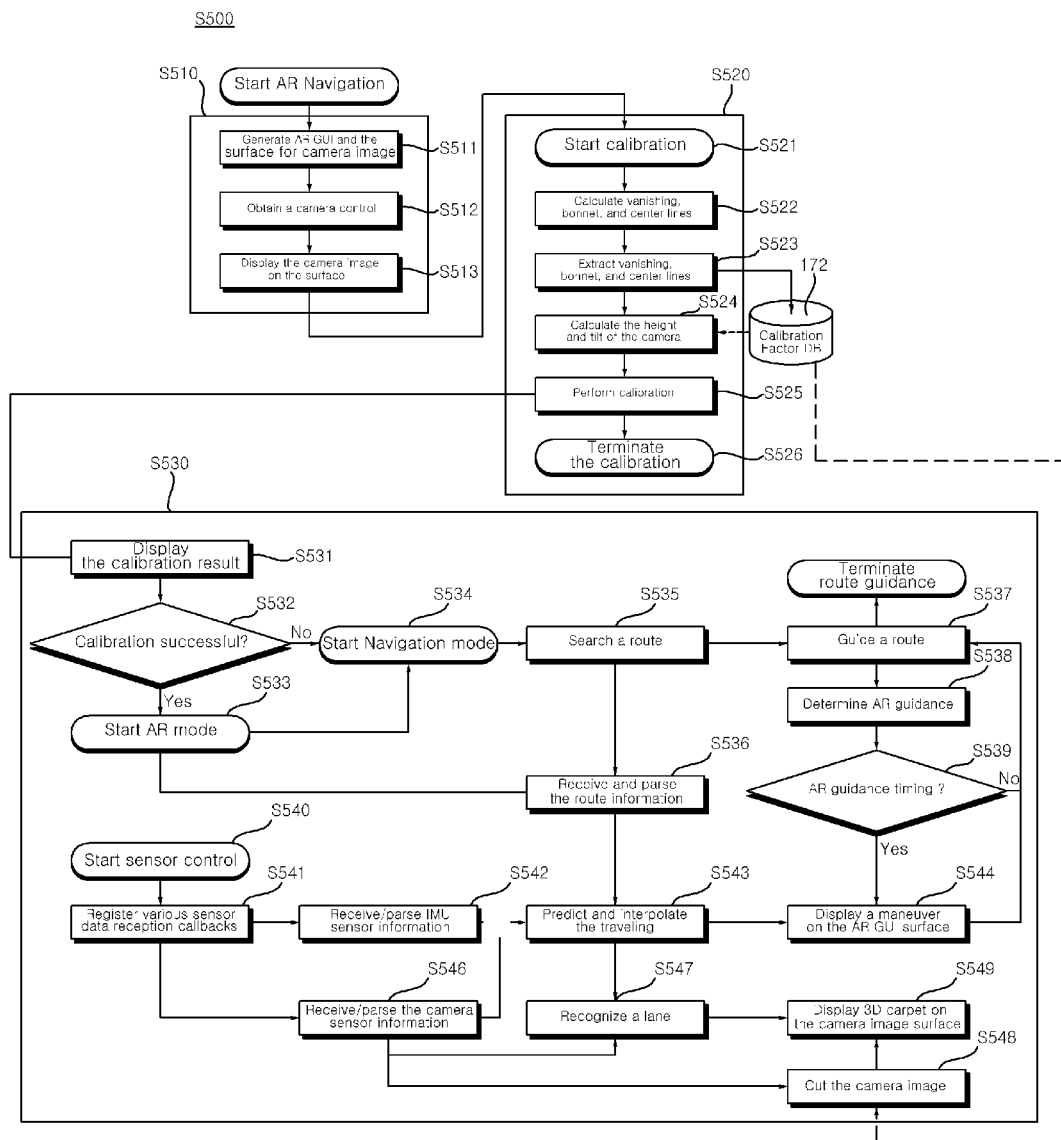

[FIG 6a]
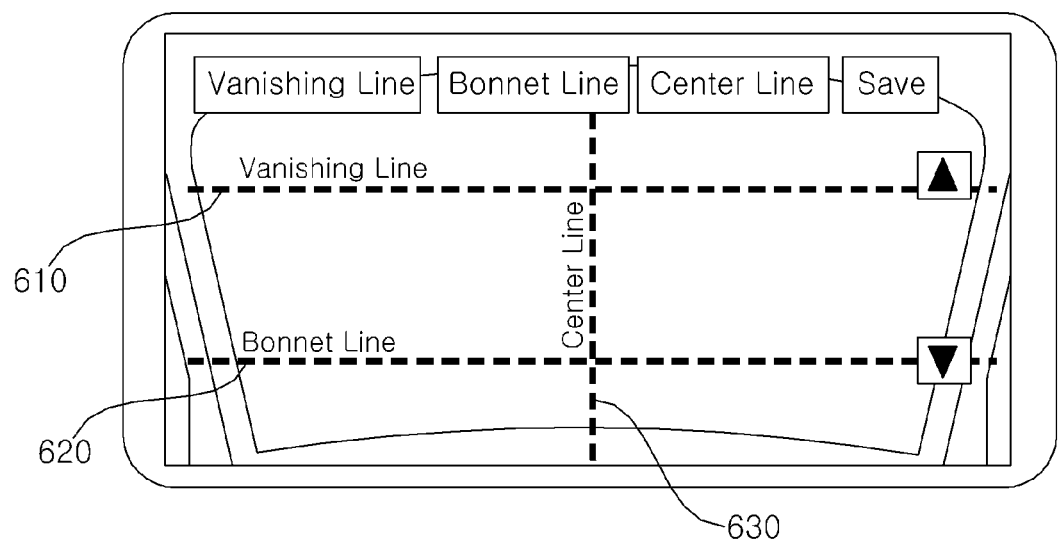
[FIG 6b]
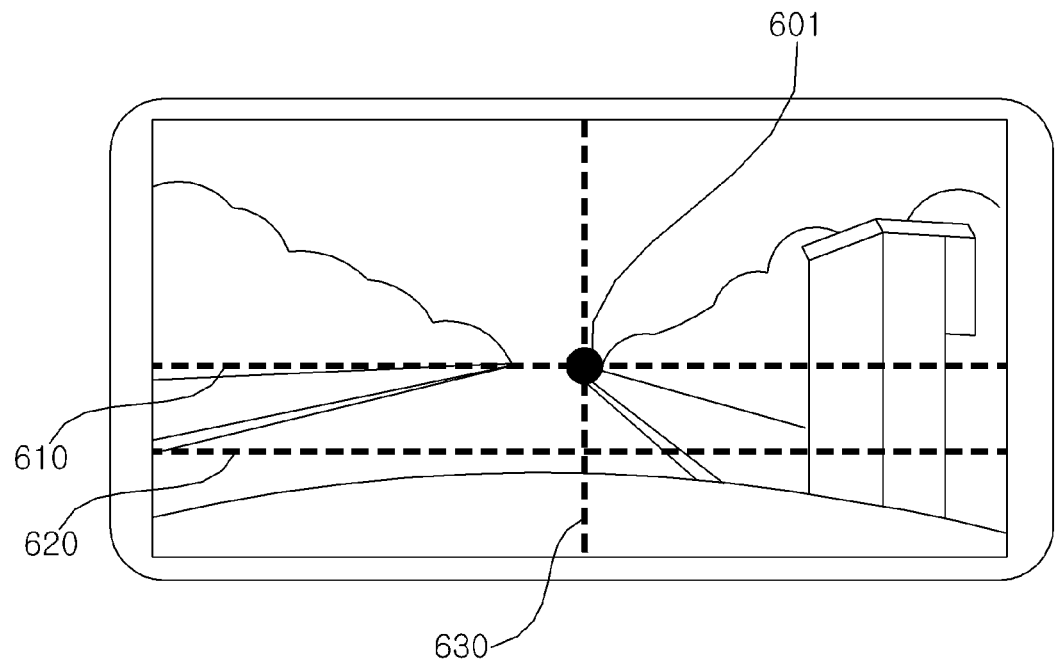

【FIG 7a】
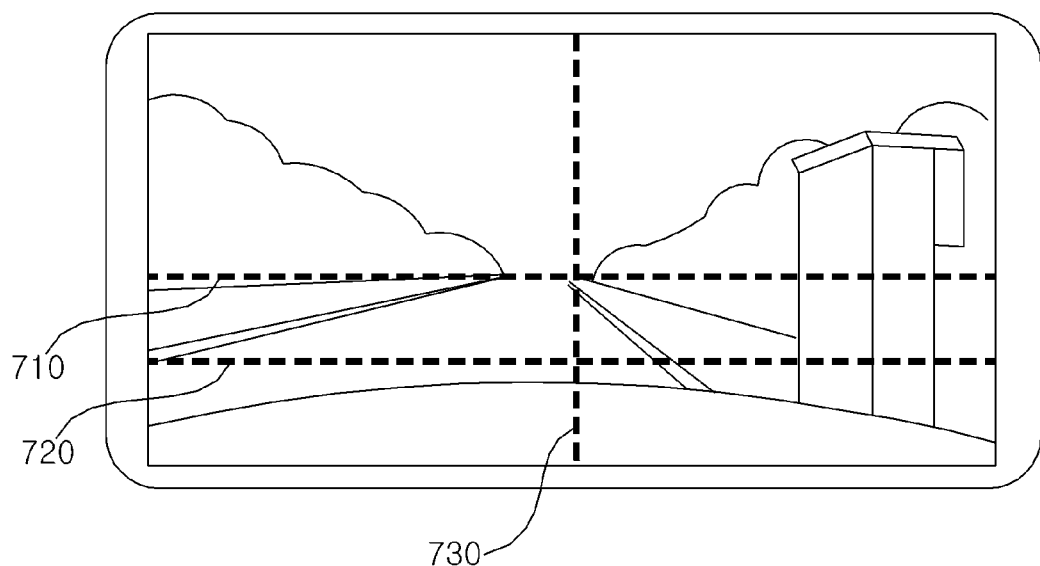
【FIG 7b】
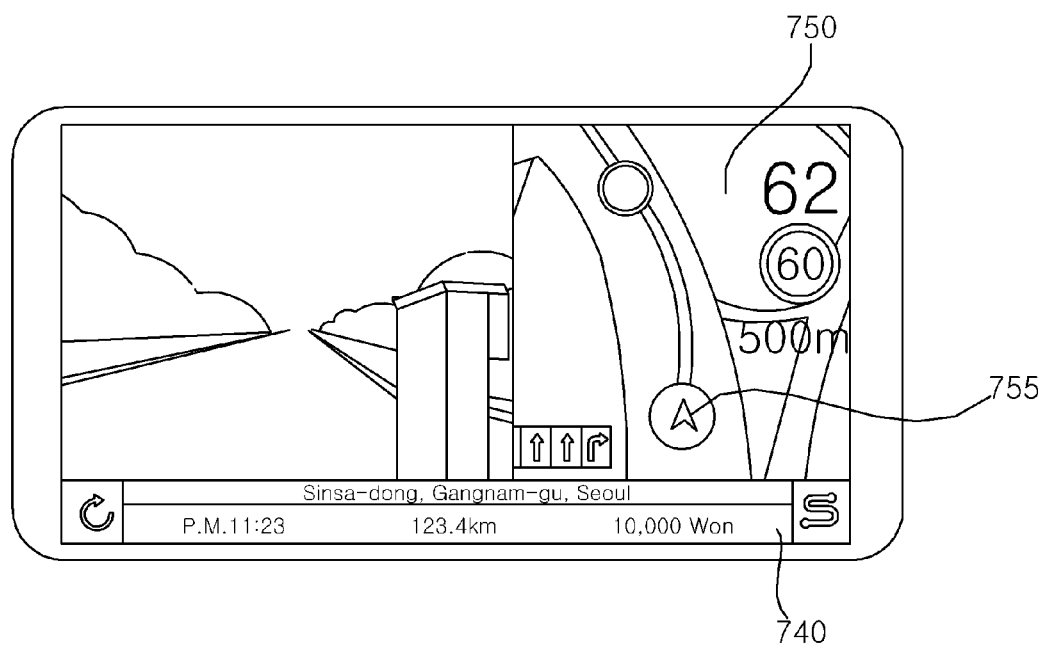

[FIG 7c]
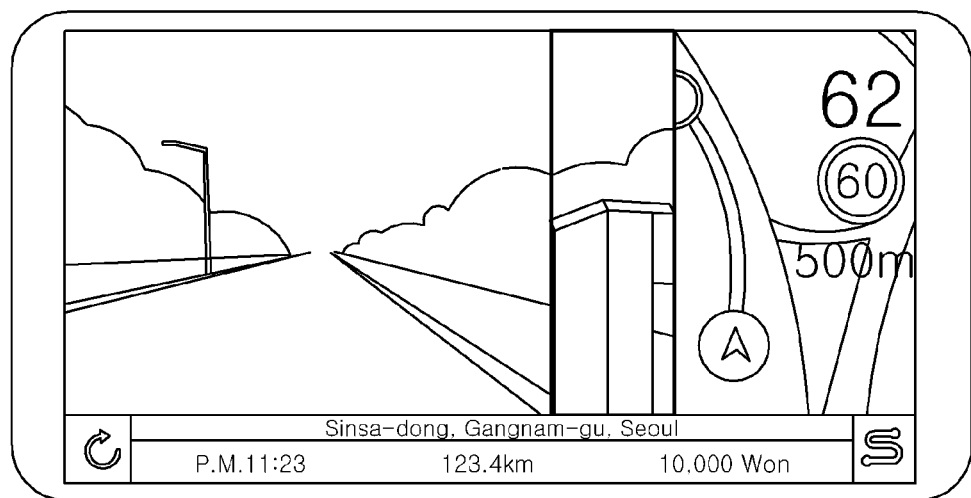
[FIG 7d]
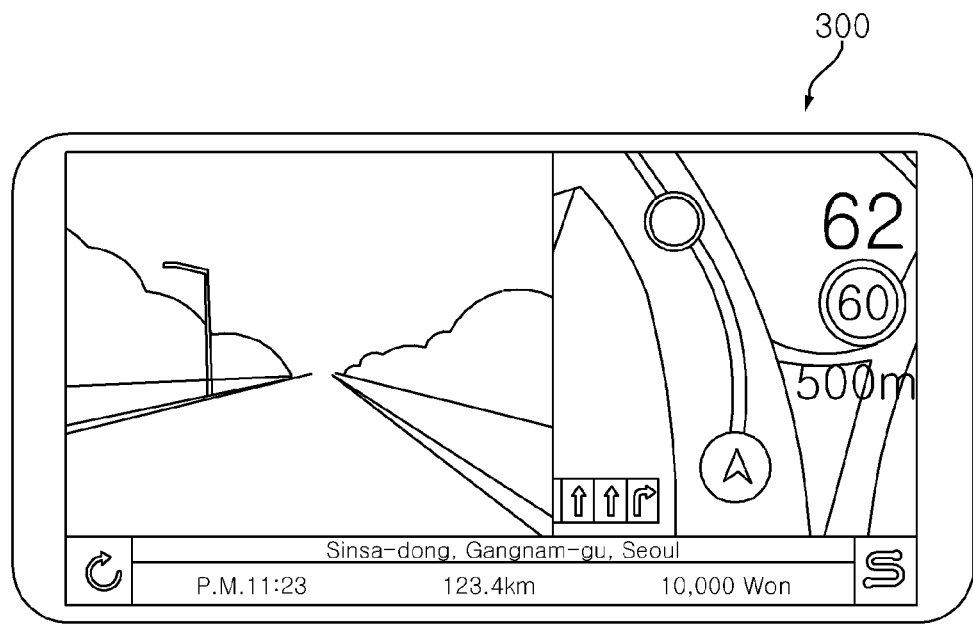

【FIG 8a】
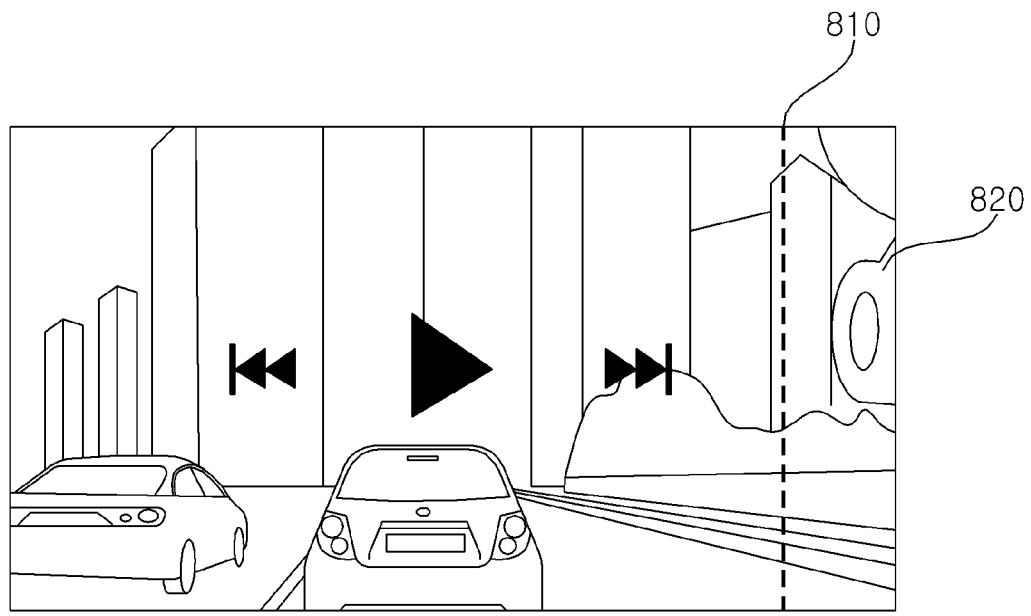
【FIG 8b】
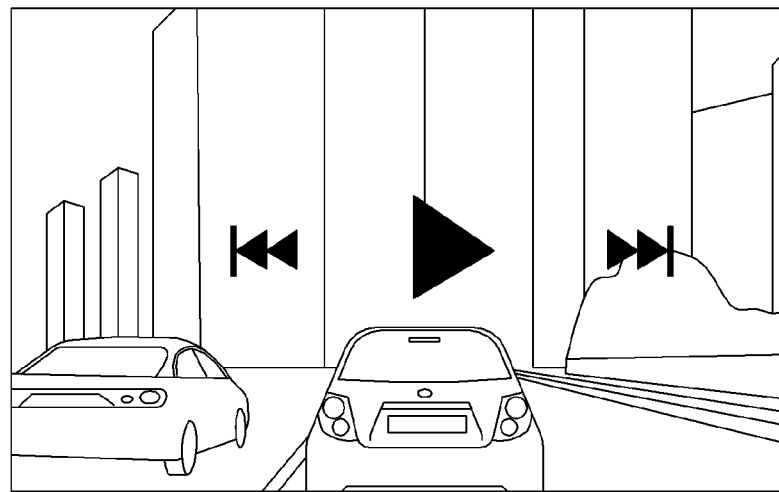

【FIG 9a】
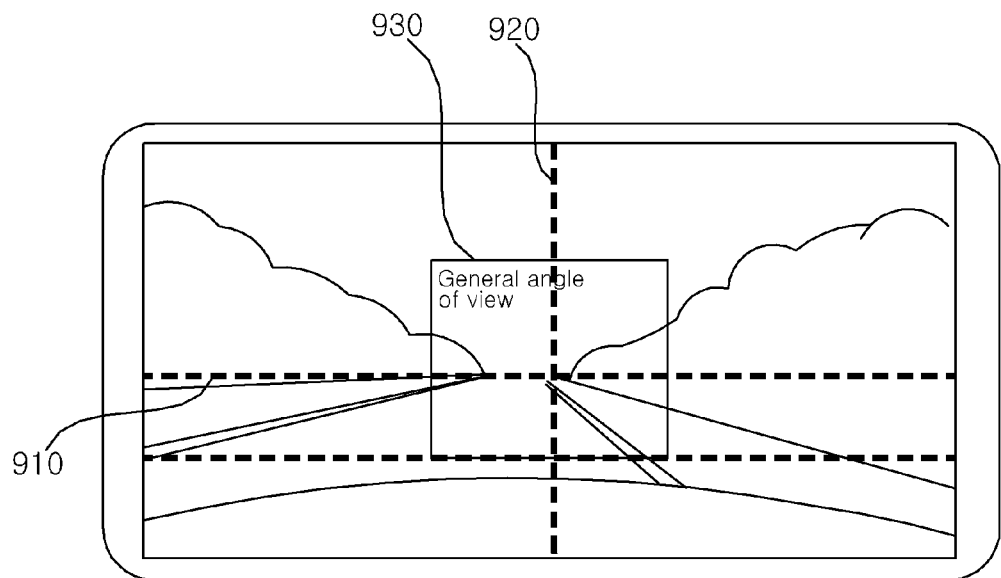
【FIG 9b】
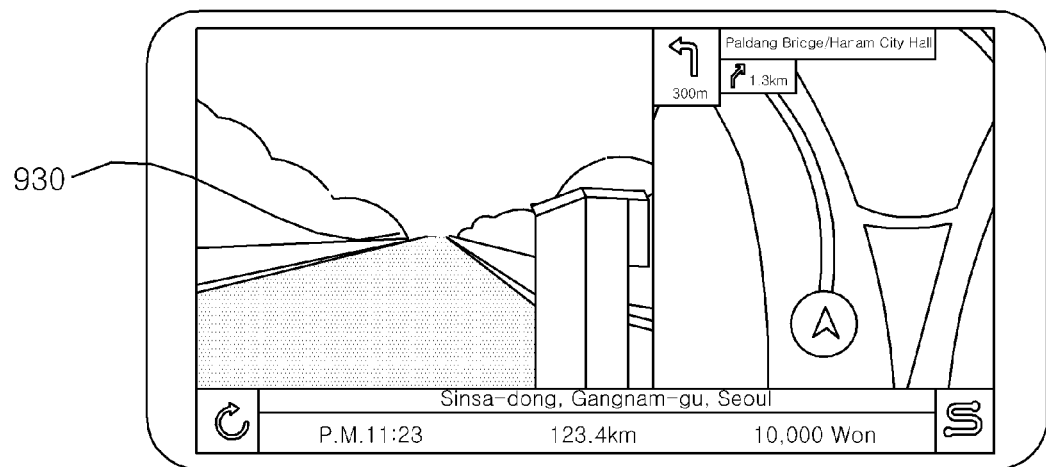

【FIG 9c】
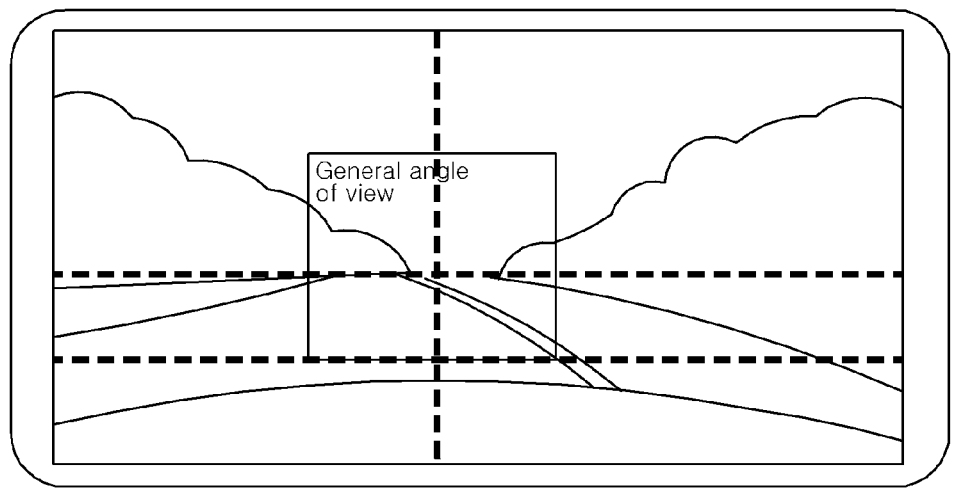
【FIG 9d】
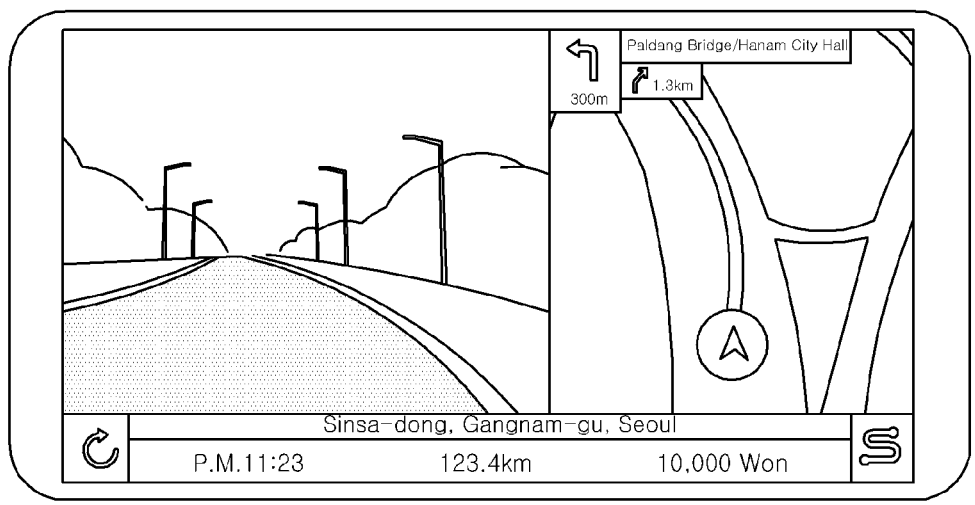

【FIG 10a】
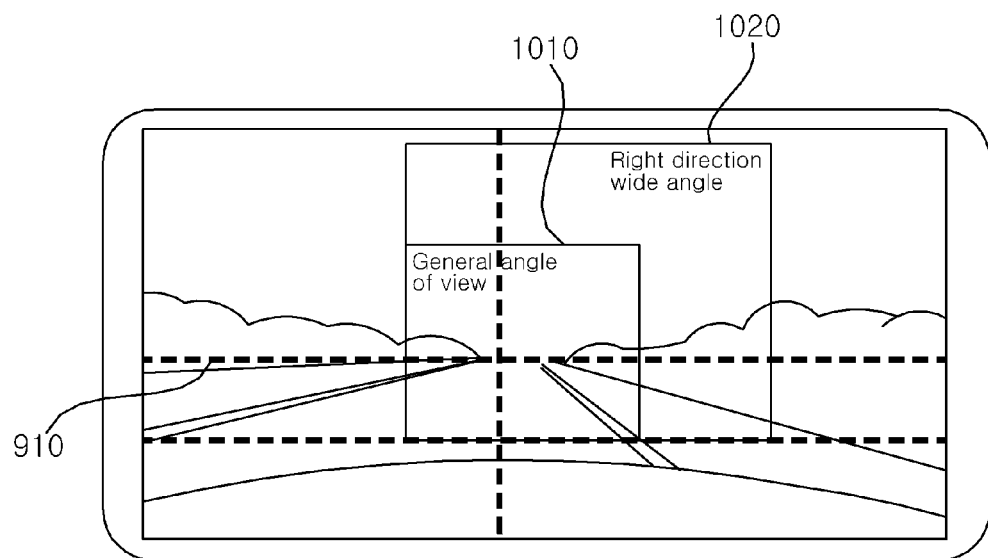
【FIG 10b】
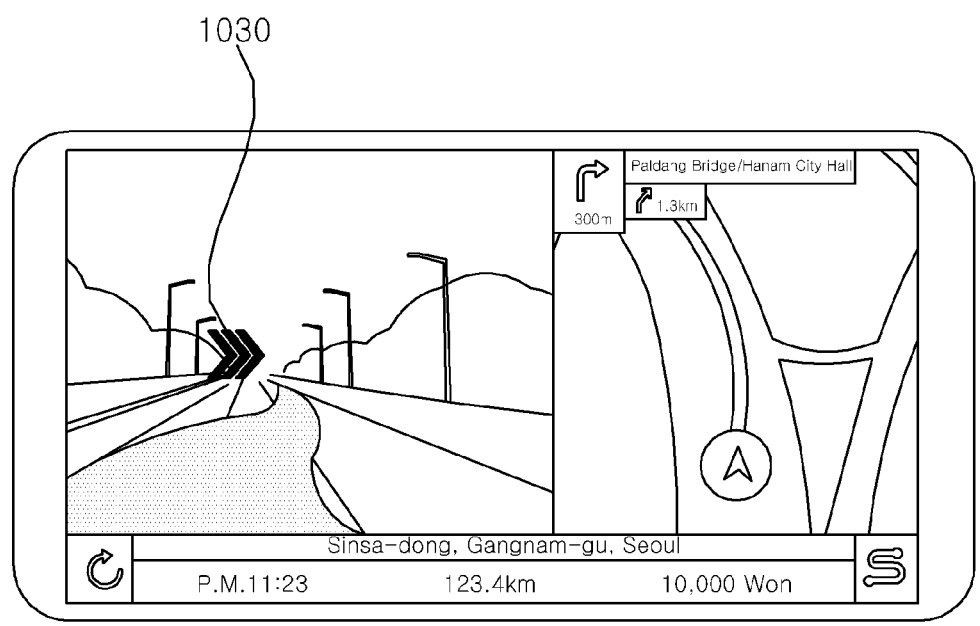

【FIG 10c】
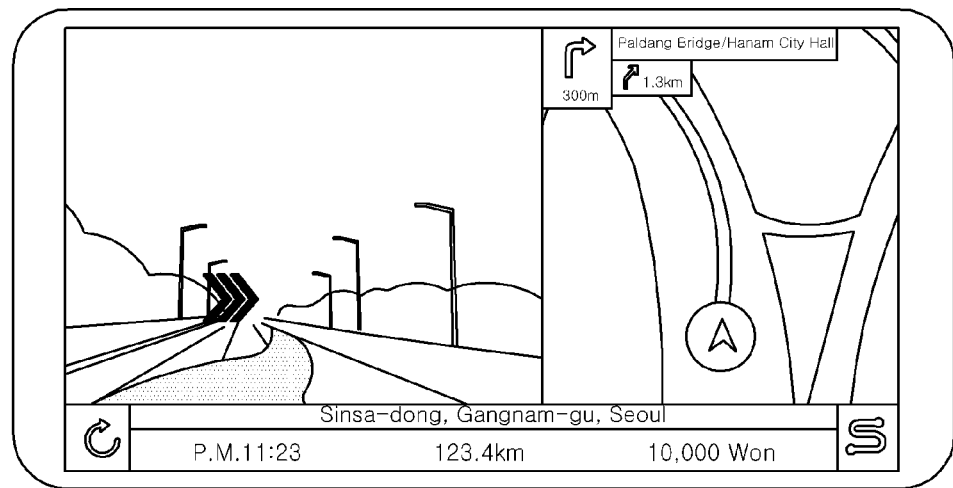
【FIG 10d】
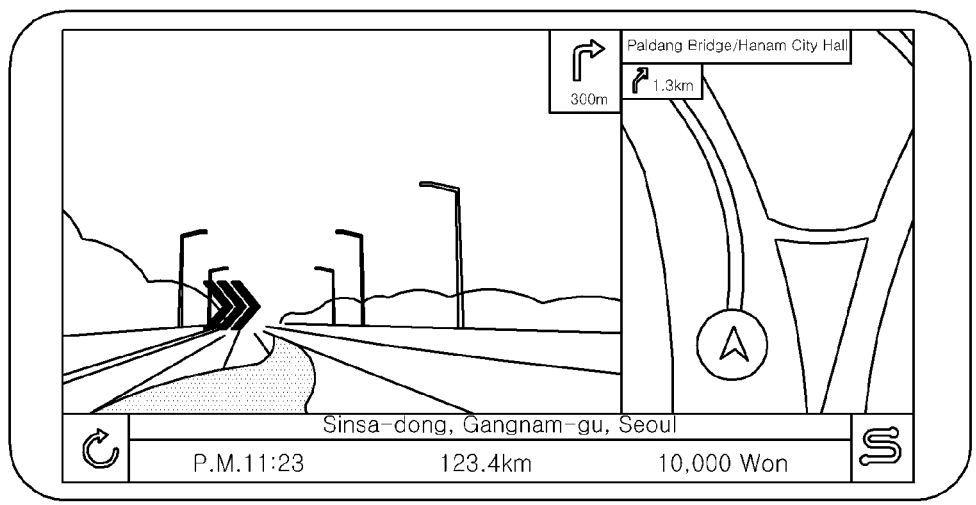

[FIG 11a]
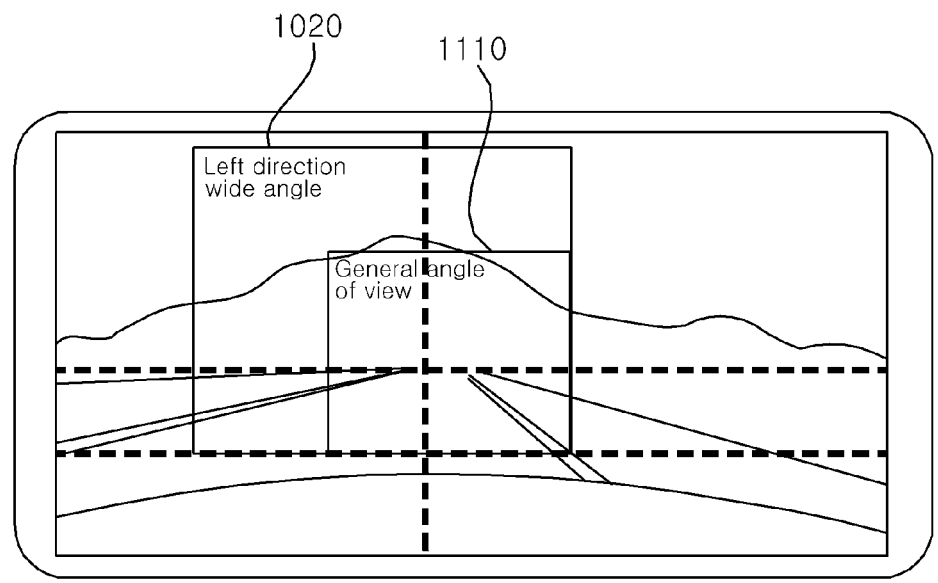
[FIG 11b]
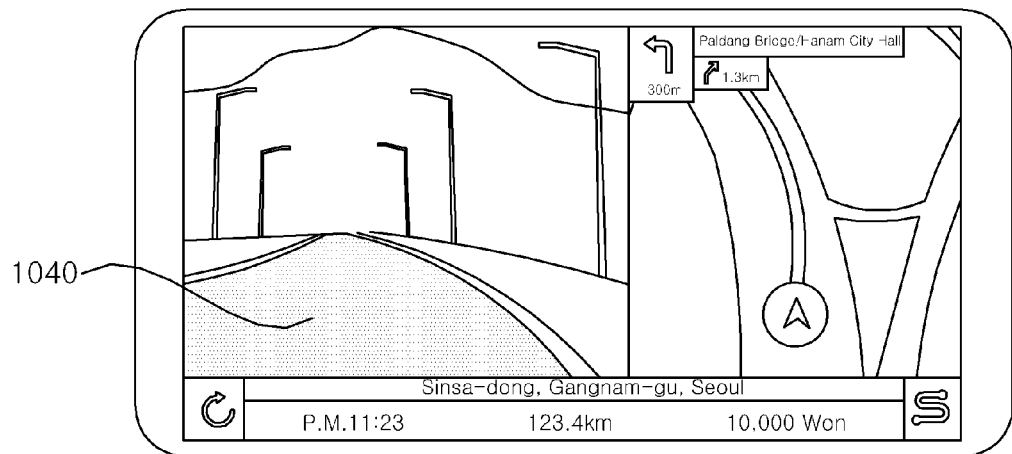

【FIG 11c】
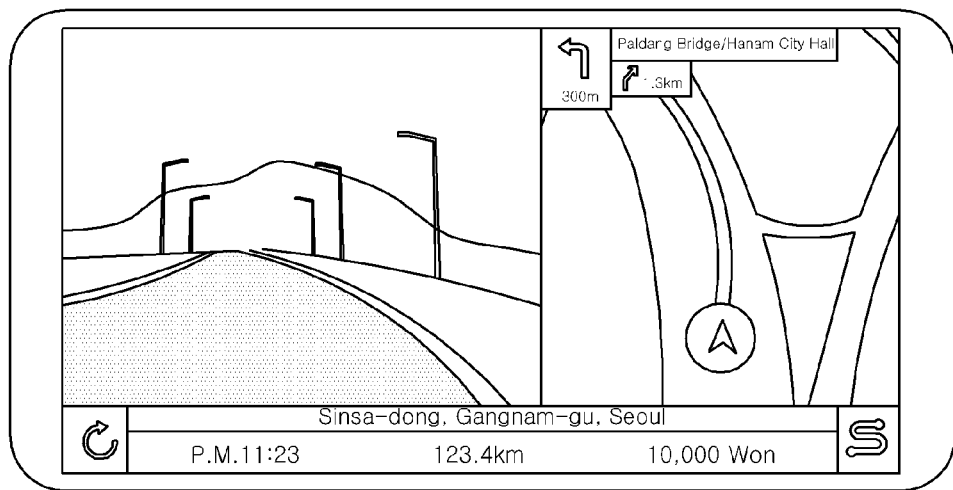
【FIG 11d】
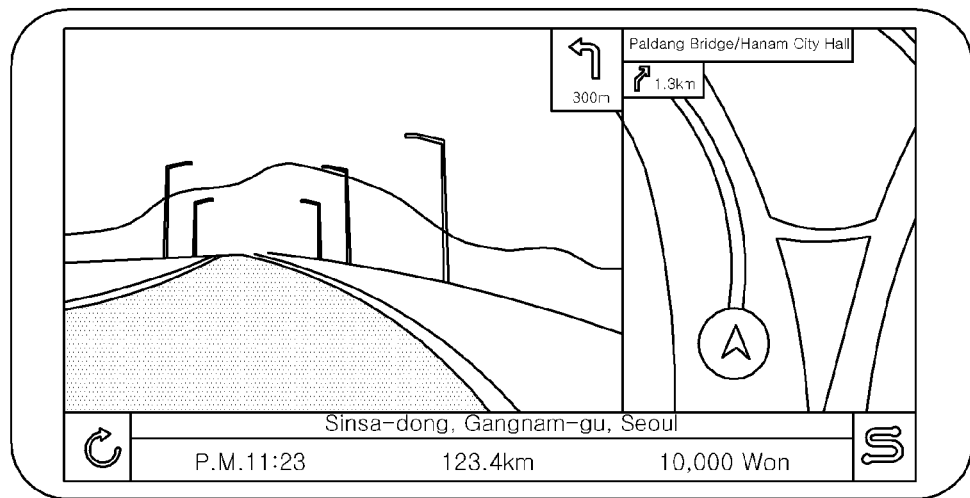

【FIG 12a】
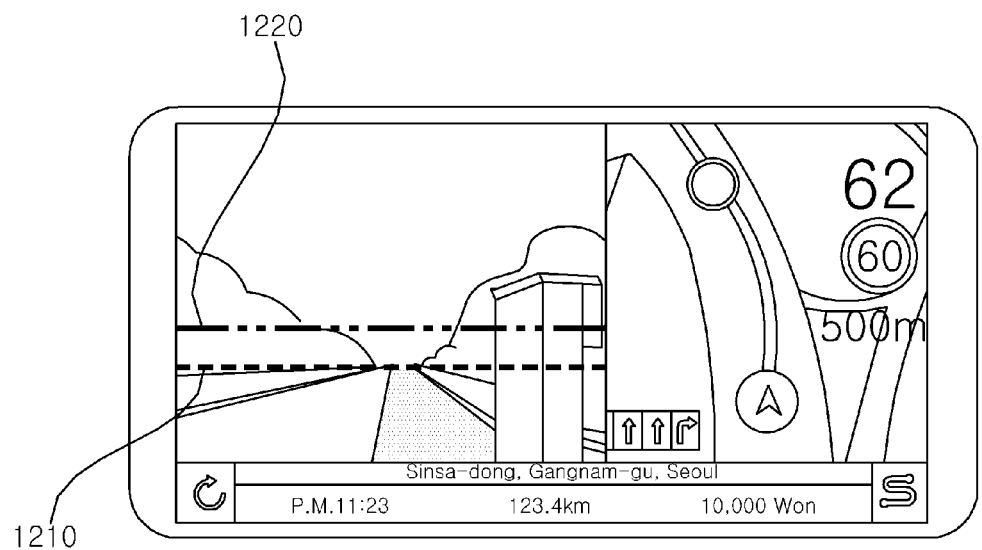
【FIG 12b】
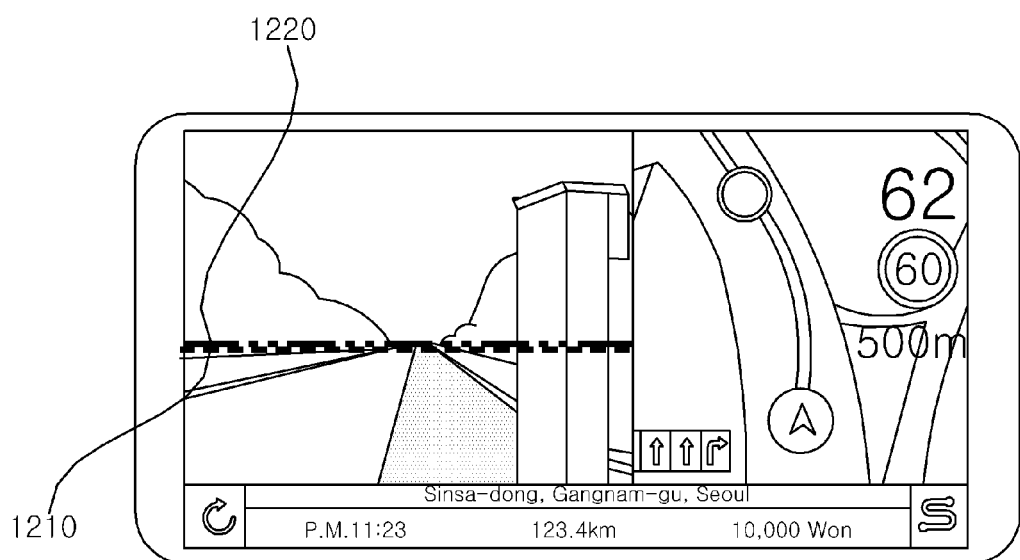

【FIG 13a】
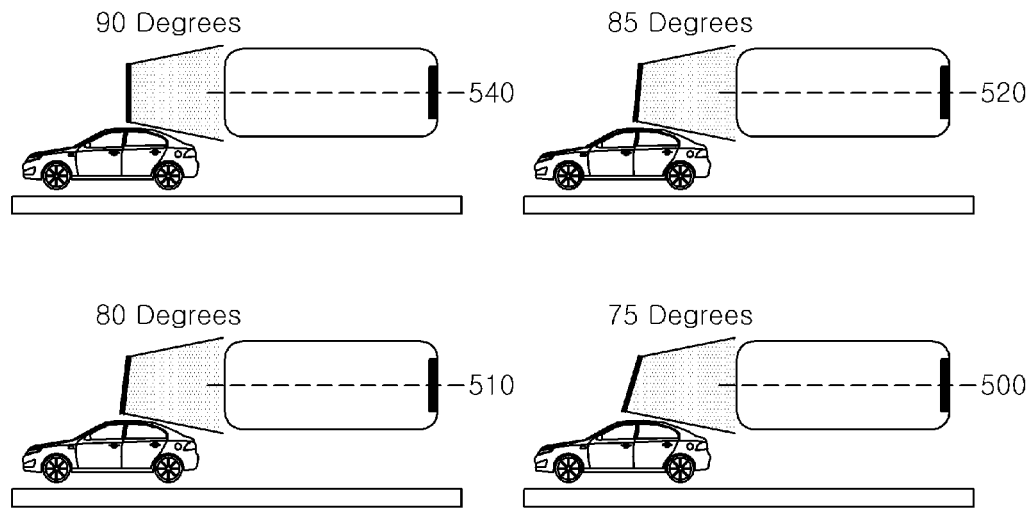
【FIG 13b】
| Vanishing Line | Angle |
|---|---|
| ... | ... |
| 500 | 75 |
| 510 | 80 |
| 520 | 85 |
| 540 | 90 |
| 560 | 95 |
| 570 | 100 |
| ... | ... |

[FIG 13c]
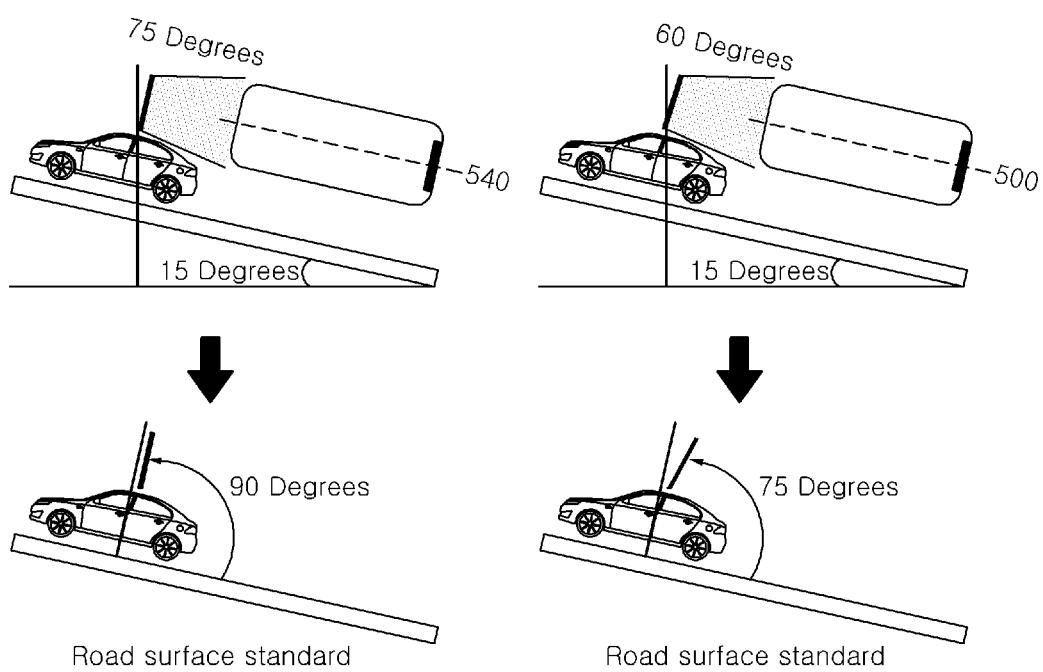

【FIG 14a】
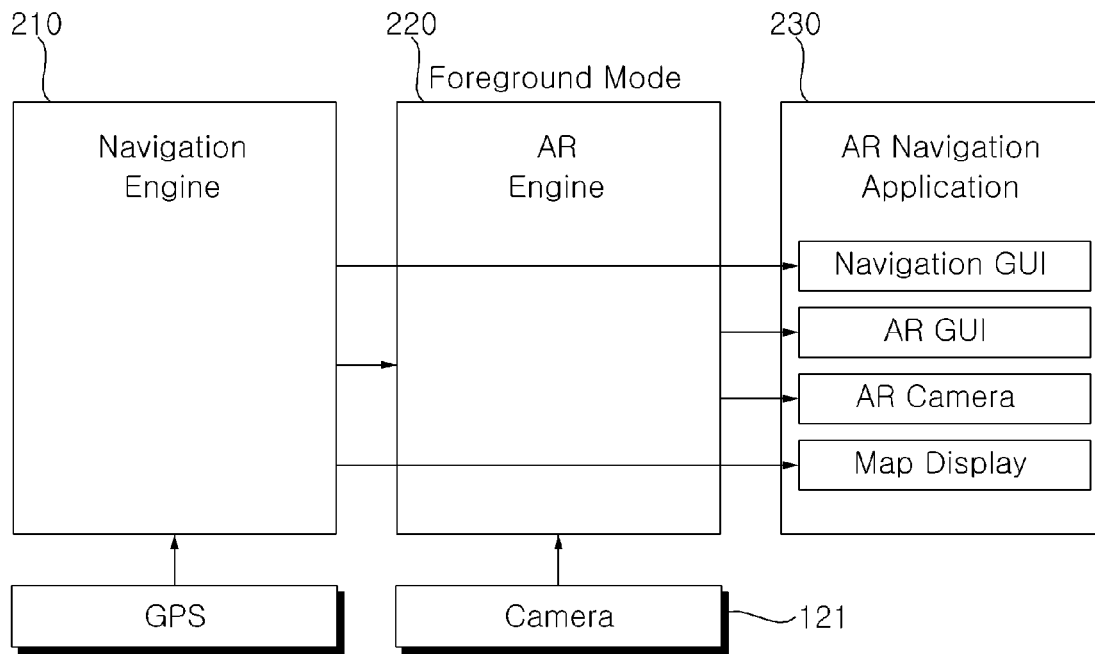
【FIG 14b】
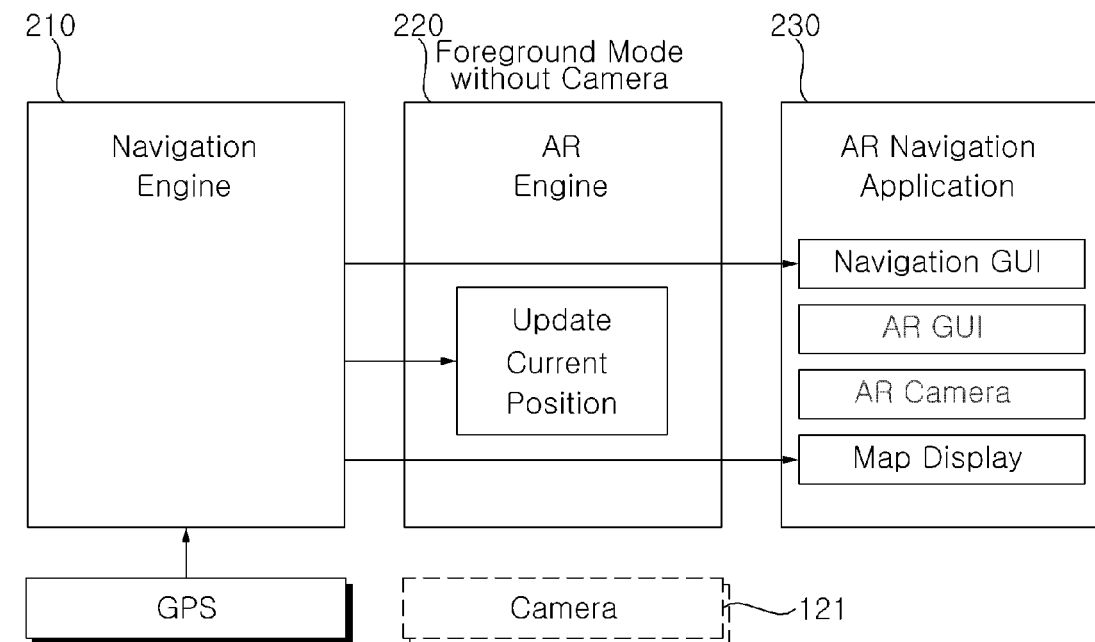

[FIG 14c]
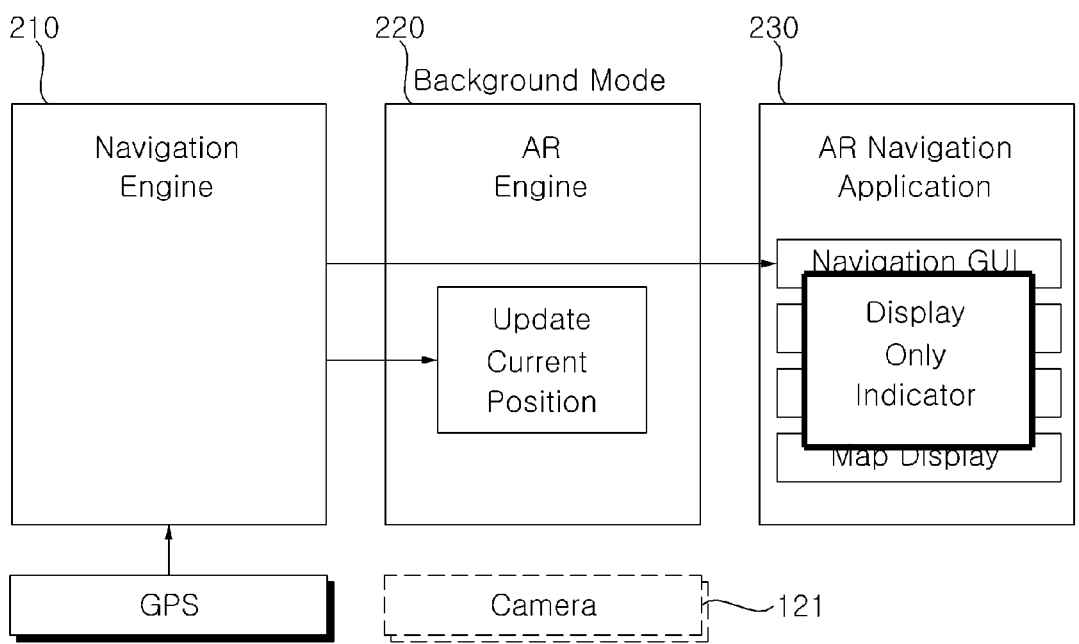

【FIG 15】
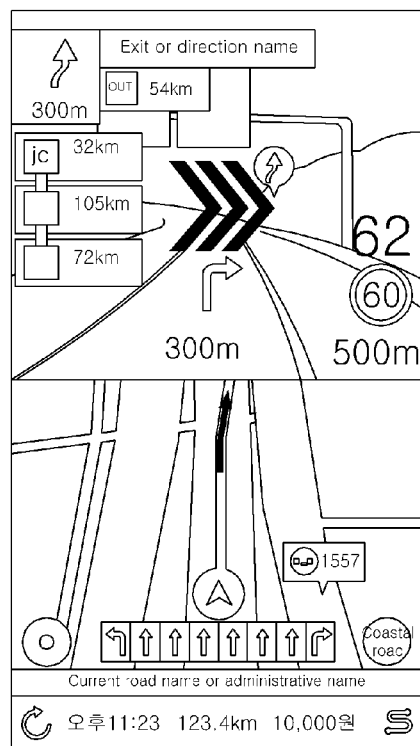
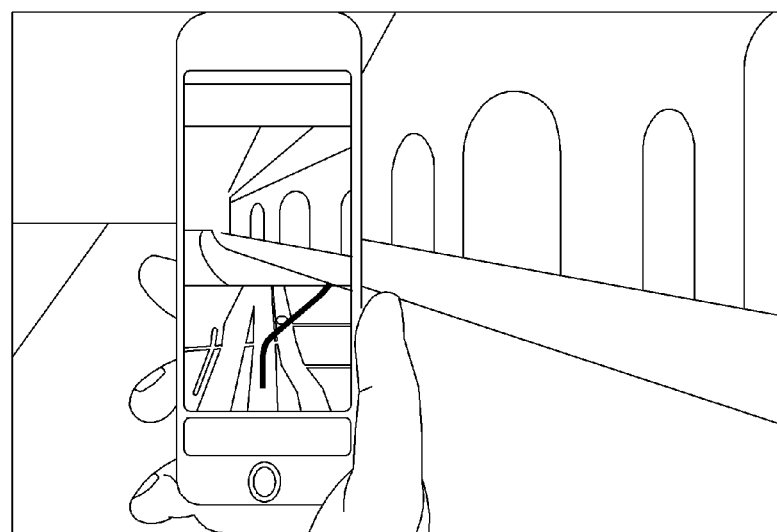

MOBILE TERMINAL AND CONTROL METHOD THEREOF

CROSS-REFERENCE TO RELATED APPLICATIONS

This application is a continuation of U.S. application Ser. No. 17/278,011, filed on Mar. 19, 2021, which is a National Stage Application under 35 U.S.C. § 371 of International Application No. PCT/KR2018/011341, filed on Sep. 21, 2018, the contents of which are hereby incorporated by reference herein in their entirety.

TECHNICAL FIELD

The present disclosure relates to a mobile terminal and a control method thereof.

BACKGROUND ART

Recently, navigation using a mobile terminal is more invigorated than a navigation device embedded in a vehicle.

When not getting on a vehicle, a user carries the mobile terminal in his/her bag or pocket, and if he/she gets on the vehicle, the mobile terminal is hold in the vehicle and used as a navigation device.

Meanwhile, in recent years, the development of augmented reality navigation. has been actively conducted. Furthermore, research for implementing augmented reality navigation in mobile terminal has been also conducted.

However, in the mobile terminal, the location or posture of the mobile terminal is changed whenever it is hold in the vehicle. Accordingly, there is a problem in that the image photographed by a camera is not uniform.

DISCLOSURE

Technical Problem

In order to solve the above problems, an object of the present disclosure is to provide a mobile terminal that displays an augmented reality navigation screen including an AR graphic object and a calibrated front image.

Another object of the present disclosure is to provide a method of operating a mobile terminal displaying an augmented realty navigation screen including an AR graphic object and a calibrated front image.

The problems of the present disclosure are not limited to the problems mentioned above, and other problems that are not mentioned will be clearly understood by those skilled. in the art from the following description.

Technical Solution

In order to achieve the above object, according to an embodiment of the present disclosure, a mobile terminal that provides an augmented reality navigation screen in a state of being hold in a vehicle, includes: at least one camera configured to obtain a front image; a display; and at least one processor configured to calibrate the front image, and to drive an augmented reality navigation application so that the augmented reality navigation screen including at least one augmented reality (AR) graphic object and the calibrated front image is displayed on the display.

According to an embodiment of the present disclosure, the processor crops a first area in which at least a portion of the vehicle is located in the front image, and the at least a portion of the vehicle includes at least one of a bonnet, a roof, an A-pillar, a dashboard, and a holder.

According to an embodiment of the present disclosure, the at least one camera includes: a first camera configured to obtain the front image; and a second camera configured to obtain a wide-angle image in comparison with the first camera, wherein the processor determines a balance of top, bottom, left and right of the front image, based on at least one of a horizontal line passing through a vanishing point detectable in the front image and a vertical line passing through the vanishing point, and determines whether to use the wide-angle image, based on the balance.

According to an embodiment of the present disclosure, the at least one camera includes: a first camera configured to obtain the front image; and a second camera configured to obtain a wide-angle image in comparison with the first camera, wherein the processor overlays a first AR graphic object on a point of the front image corresponding to a first object detected from the front image, and determines whether to use the wide-angle image, based on a location of the first AR graphic object in the front image.

According to an embodiment of the present disclosure, the processor positions a left-right vanishing line detectable in the front image in a center of vertical direction of the navigation screen.

According to an embodiment of the present disclosure, the mobile terminal further includes; a gyroscope sensor configured to generate first sensing data; and an acceleration sensor configured to generate second sensing data, wherein the mobile terminal determines a holding tilt value, based on the first sensing data and the second sensing data, and compensates the holding tilt value on the navigation screen.

According to an embodiment of the present disclosure, when receiving at least one of a home button input signal and other application execution input signal, the processor deactivates the camera and drives the augmented reality navigation application in a background.

According to an embodiment of the present disclosure, when obtaining vehicle stop state information, the processor deactivates the camera and drives the augmented reality navigation application to display a navigation screen excluding the front image and the AR graphic object.

According to an embodiment of the present disclosure, when obtaining vehicle moving state information after a vehicle stop state, the processor activates the camera and calibrates a front image obtained from the activated camera based on calibration data prior to deactivation of the camera.

Details of other embodiments are included in the detailed description and drawings.

Advantageous Effects

According to the present disclosure, there are one or more of the following effects.

First, when a mobile terminal is hold in a vehicle, there is an effect of providing an augmented reality navigation screen based on a front image that is calibrated without a separate setting.

Second, whenever a mobile terminal is hold in the vehicle, it is not necessary to adjust the posture of the mobile terminal or to perform manual calibration.

Third, even when a user gets on various types of vehicles, there is an effect of relieving the hassle of setting each time.

The effects of the present disclosure are not limited to the effects mentioned above, and other effects not mentioned can be clearly understood by those skilled in the art from the description of the claims.

DESCRIPTION OF DRAWINGS

FIG. 1 is a block diagram of a mobile terminal according to an embodiment of the present disclosure.

FIG. 2 is a detailed block diagram of a processor according to an embodiment of the present disclosure.

FIG. 3 is a diagram referenced for explaining a navigation screen according to an embodiment of the present disclosure.

FIG. 4 is a diagram referenced for explaining an operation of generating a navigation screen according to an embodiment of the present disclosure.

FIG. 5 is a flow chart according to an embodiment of the present disclosure.

FIGS. 6A and 6B are diagrams referenced for explaining a vanishing line, a bonnet line, and a center line according to an embodiment of the present disclosure.

FIGS. 7A to 7D are diagrams referenced for explaining a cropping operation according to an embodiment of the present disclosure.

FIGS. 8A and 8B are diagrams referenced for explaining a cropping operation according to an embodiment of the present disclosure.

FIGS. 9A to 11D are diagrams referenced for explaining an operation of using a wide-angle image according to an embodiment of the present disclosure.

FIGS. 12A and 12B are diagrams referenced for explaining an operation of adjusting a vanishing line according to an embodiment of the present disclosure.

FIGS. 13A to 13C are diagrams referenced for explaining an operation of compensating a tilt value of mobile terminal setting according to an embodiment of the present disclosure.

FIGS. 14A. to 14C are diagrams referenced for explaining an operation of a mobile terminal in a specific situation according to an embodiment of the present disclosure.

FIG. 15 is a diagram referenced for explaining an operation of a mobile terminal in a walking mode according to an embodiment of the present disclosure.

MODE FOR INVENTION

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module"and "unit"are used or combined with each other only in consideration of ease in the preparation of the specification, and do not have or serve as different meanings. Accordingly, the suffixes "module"and "unit"may be interchanged with each other. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and spirit of the present disclosure.

Although the terms "first,""second,"etc. , may be used herein to describe various components, these components should not be limited by these terms. These terms are only used to distinguish one component from another component. When a component is referred to as being "connected to"or "coupled to"another component, it may be directly connected to or coupled to another component or intervening components may be present. In contrast, when a component is referred to as being "directly connected to"or "directly coupled to"another component, there are no intervening component present.

As used herein, the singular form is intended to include the plural forms as well, unless the context clearly indicates otherwise.

In the present application, it will be further understood that the terms "comprises", includes,"etc. specify the presence of stated features, integers, steps, operations, elements, components, or combinations thereof, but do not preclude the presence or addition of one or more other features, integers, steps, operations, elements, components, or combinations thereof.

In the following description, the left side means the left side in the forward driving direction of a vehicle, and the right side means the right side in the forward driving direction of a vehicle.

FIG. 1 is a block diagram of a mobile terminal according to an embodiment of the present disclosure.

Referring to FIG. if a mobile terminal 100 may include a portable phone, a smart phone, a laptop computer, a digital broadcasting terminal, a personal digital assistants (PDA), a portable multimedia player (PMP), a navigation system, a slate PC, a tablet PC, an ultrabook, wearable device (e.g., a smartwatch, a smart glass, a head mounted display (HMD)), and the like.

The mobile terminal 100 may provide an augmented reality navigation screen while being hold in a vehicle. The mobile terminal 100 may be hold inside the vehicle such that a display 151 faces the cabin of the vehicle and at least one camera 121 faces the front of the vehicle.

The mobile terminal 100 may include a wireless communication unit 110, at least one camera 121, a gyroscope sensor 143, an acceleration sensor 144, a display 151, a memory 170, at least one processor 180, and a power supply unit 190.

The mobile terminal 100 may further include a wireless communication unit including a broadcast reception module, a mobile communication module, a wireless Internet module, a short-range communication module, and a location information module. The mobile terminal 100 may further include an input unit including a microphone and a user input unit. According to an embodiment, the camera 121 may be classified as a sub-element of the input unit. The mobile terminal 100 may further include a sensing unit including a proximity sensor and an illuminance sensor. The mobile terminal 100 may include an output unit including an audio output unit, a haptic module, and an optical output unit. According to an embodiment, the display 151 may be classified as a sub-element of the output unit. The mobile terminal 100 may further include an interface unit for exchanging power or data with other device.

The wireless communication unit 110 may include one or more modules that enable a wireless communication between the mobile terminal 100 and a wireless communication system, between the mobile terminal 100 and other mobile terminal 100, or between the mobile terminal 100 and an external server. The wireless communication unit 110 may include one or more modules that connect the mobile terminal 100 to one or more networks.

The wireless communication unit 110 transmits and receives a wireless signal with at least one of a base station, an external terminal, and a server on a mobile communication network built according to technical standards or communication methods for mobile communication (e.g. Global System for Mobile communication (GSM), Code Division Multi Access (CDMA), Code Division Multi Access 2000 (CDMA2000), Enhanced Voice Data Optimized or Enhanced Voice-Data Only (EV-DO), Wideband CDMA (WCDMA), High Speed Downlink Packet Access (HSDPA), High Speed Uplink Packet Access (HSUPA), Long Terra Evolution (LTE), Long Term Evolution-Advanced (LTE-A, 5G), and the like).

The camera 121 may process an image frame such as a still image or a moving image obtained by an image sensor. The processed image frame may be displayed on the display unit 151 or stored in the memory 170. The camera 121 includes at least one of a camera sensor (e.g. CCD, CMOS, etc.), a photo sensor (or image sensor), and a laser sensor.

The camera 121 may obtain a front image of the vehicle. The obtained front image of the vehicle may be stored in the memory 170 or transmitted to the processor 180. The camera 121 may be activated or deactivated based on a control signal generated by the processor 180.

The camera 121 may include a first camera and a second camera.

The first camera may obtain a front image of the vehicle. The first camera may obtain a narrow angle image in comparison with the second camera. The first camera may be disposed around the second camera. The first camera may be activated or deactivated based on a control signal generated by the processor 180.

The second camera may obtain a front image of the vehicle. In a deactivated state, the second camera may be activated according to a request signal from the processor 180 to obtain a front image. The second camera may obtain a wide-angle image in comparison with the first camera. The second camera may be activated or deactivated based on a control signal generated by the processor 180.

The gyroscope sensor 143 may allow the mobile terminal 100 to measure the angular velocity of the mobile terminal 100. The gyroscope sensor 143 may Generate first sensing data based on the measured angular velocity.

The acceleration sensor 144 may measure the acceleration of the mobile terminal 100. The acceleration sensor 144 may generate second sensing data based on the measured acceleration.

The display 151 displays (outputs) information processed by the mobile terminal 100. For example, the display unit 151 may display execution screen information of an application program driven in the mobile terminal 100, or User Interface (UI) and Graphic User Interface (GUI) information according to the execution screen information.

The display unit 151 may include at least one of a liquid crystal display (LCD), a thin film transistor-liquid crystal display (TFT LCD), an organic light-emitting diode (OLED), a flexible display, a 3D display, and an e-ink display.

In addition, two or more display units 151 may exist according to the implementation form of the mobile terminal 100. In this case, in the mobile terminal 100, a plurality of display units may be spaced apart from or integrally disposed on one surface, or may be disposed on different surfaces respectively.

The display unit 151 may include a touch sensor that senses a touch on the display unit 151 so as to receive a control command by a touch method. Using this, when a touch is accomplished for the display unit 151, the touch sensor detects the touch, and based on this, the processor 180 may be configured to generate a control command corresponding to the touch. The content input by the touch method may be letters or numbers, or menu items that can be indicated or designated in various modes. As described, the display unit 151 may form a touch screen together with a touch sensor, and in this case, the touch screen may serve as a user input unit.

The memory 170 stores data supporting various functions of the mobile terminal 100. The memory 170 may store a number of application programs or applications driven by the mobile terminal 100, data for operation of the mobile terminal 100, and commands. At least some of these application programs may be downloaded from an external server through wireless communication. In addition, at least some of these application programs may exist in the mobile terminal 100 from the time of delivery for the basic function call receipt, outgoing functions, message reception and outgoing functions) of the mobile terminal 100. Meanwhile, the application program may be stored in the memory 170, installed in the mobile terminal 100, and driven by the processor 180 to perform an operation (or function) of the mobile terminal.

The memory 170 may store a program for the operation of the processor 180, and may temporarily store input/output data (e.g. a phone book, a message, a still image, a moving image, etc.). The memory 170 may store data on vibration and sound of various patterns that are output when a touch input on the touch screen is accomplished.

The memory 170 may include at least one type of storage medium among a flash memory type, a hard disk type, a solid state disk (SSD) type, a silicon disk drive (SDD) type, a multimedia card micro type, a card-type memory (e.g., SD or XD memory, etc), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 100 may be operated in connection with a web storage that performs a storage function of the memory 170 over the Internet.

The processor 180 may be electrically connected to the camera 121, the gyroscope sensor 143, the acceleration sensor 144, the display 151, the memory 170, and the power supply unit 190 to exchange signals. The processor 180 may be implemented by using at least one of application specific integrated circuits (ASICs), digital signal processors (DSPs), digital signal processing devices (DSPDs), programmable logic devices (PLDs), field programmable gate arrays (FPGAs), processors, and controllers, micro-controllers, microprocessors, and electrical units for performing other functions. The processor 180 may be driven by power provided from the power supply unit 190.

The processor 180 controls the overall operation of the mobile terminal 100. The processor 180 may provide or process appropriate information or functions to a user by processing the above input or output signals, data, information, etc., or by driving an application program stored in the memory 170.

The processor 180 may receive a front image of the vehicle.

The processor 180 may calibrate the front image.

The processor 180 may perform calibration by cropping the front image. In the front image, areas that are unnecessary for the configuration of the navigation screen may exist. The processor 180 may remove these unnecessary areas. The processor 180 may crop a first area where at least a portion of the vehicle is located in the front image. Here, at least a portion of the vehicle may include at least one of a bonnet, a roof, an A-pillar, a dashboard, and a holder. The processor 180 may crop the first area based on image processing using a histogram.

The processor 180 may output navigation related information to the cropped area. For example, the processor 180 may display at least one of time information, location information, information of road being driven, departure point information, departure time information, destination information, information of distance remaining to destination, information of time remaining to the destination, and estimated arrival time information, on the cropped area.

The processor 180 may perform calibration by using a wide-angle image. The processor 180 may determine the balance of top, bottom, left and right of the front image, based on at least one of a horizontal line passing through a vanishing point detectable in the front image acquired by the first camera and a vertical line passing through the vanishing point. The processor 180 may determine whether to use the wide-angle image obtained. by the second camera, based on the balance of top, bottom, left and right of the front image. The processor 180 may overlay a first AR graphic object on a point of the front image corresponding to the first object detected in the front image obtained by the first camera. The processor 180 may determine whether to use the wide-angle image, based on the location of the first AR graphic object in the front image.

The processor 180 may perform calibration by adjusting the location of a vanishing line detectable in the front image. The processor 180 may position a left-right direction vanishing line detectable in the front image at the center of the navigation screen in the vertical direction.

The processor 180 may perform calibration by compensating a holding tilt value of the mobile terminal 100. The processor 180 may determine the holding tilt value, based on the first sensing data received from the gyroscope sensor 143 and the second sensing data received from the acceleration sensor 144. The processor 180 may compensate the tilt value on the navigation screen. The processor 180 may compensate the first sensing data and the second sensing data using a Kalman filter. According to an embodiment, the processor 180 may determine a holding tilt value, further based on data received from the geomagnetic sensor and the temperature sensor. According to an embodiment, the processor 180 may determine and compensate a holding tilt value, based on third sensing data received from a gravity sensor.

The processor 180 may drive an augmented reality navigation application so that the augmented reality navigation screen is displayed on the display 151. The augmented reality navigation screen may include at least one augmented reality AR graphic object and a calibrated front image.

The processor 180 may receive at least one of a home button input signal and other application execution input signal, through a user input unit. In this case, the processor 180 may deactivate the camera 121 so that acquisition of the front image is stopped. The processor 180 may drive an augmented reality navigation application in the background. Through such control, it is possible to prevent the waste of battery and processing power generated while unnecessarily obtaining and processing a front image.

The processor 180 may obtain vehicle stop state information by processing the front image or receiving a signal from the vehicle. The processor 180 may deactivate the camera 121 when obtaining the vehicle stop state information. In this case, the processor 180 may drive the augmented reality navigation application to display the navigation screen excluding the front image and the AR graphic object. The processor 180 may obtain information on vehicle moving state after the vehicle is stopped, by processing a front image or receiving a signal from the vehicle. The processor 180 may activate the camera 121, when obtaining the information on vehicle moving state after the vehicle is stopped. The processor 180 may calibrate the front image obtained from the activated camera, based on the calibration data before the camera 121 is deactivated.

The processor 180 may receive at least one of a signal, information, and data from a server, through the wireless communication unit 110. The processor 180 may receive augmented reality navigation application data from a server.

The processor 180 may receive directions information from a server, and drive a navigation application based on the directions information. The directions information may include map data and an AR graphic object.

The processor 180 may receive map data from a server. The map data may include at least one of standard definition (SD) map data and high definition (HD) map data. The processor 180 may download the entire map data at a specific time and store it in the memory 170 for use. The processor 180 may download only some of the entire map data at a preset cycle, store it in the memory 170 and use it temporarily. Map data that completed usage may be deleted. The processor 180 may receive AR graphic object (e.g. AR indicator) data from a server.

The processor 180 may download only some data of the entire map data based on a set route, store it in the memory 170 and use it temporarily. The processor 180 may receive map data corresponding to a route generated by a destination input by a user, and store the received map data in the memory 170. The processor 170 may receive an AR graphic object corresponding to a route along with map data, and store the received AR graphic object in the memory 170. The processor 170 may delete the map data and the AR graphic object stored in the memory 170 after using them.

When the directions information is updated while driving the navigation based on the directions information received from the server, the processor 180 may receive the updated directions information and drive the navigation application. The processor 180 may change a preset route according to the updated directions information. The processor 180 may receive directions information corresponding to an expected driving route in real time. The processor 180 may adjust the amount of reception of directions information corresponding to a section including the expected driving route according to the communication strength. For example, when. the communication strength is greater than or equal to a first reference value, the processor 180 may receive directions information corresponding to a relatively long section.

According to an embodiment, a plurality of surfaces (a navigation map surface, an AR camera surface, an AR GUI surface, and a navigation GUI surface) described later may be generated in a server. The processor 180 may receive a plurality of surfaces from a server to configure a navigation screen. The processor 180 may adjust the number of received surfaces according to the communication strength. For example, when the communication strength is weak, the processor 180 may receive only the navigation GUI surface and then additionally receive the AR GUI surface when the communication strength is gradually increased.

The processor 180 may receive AR graphic information processed by the server and output an AR indicator based on the received AR graphic information. When there is a point of interest (POI) preset by the augmented reality navigation application, the processor 180 may additionally display an AR indicator, during AR directions. The processor 180 may receive POI information from the server in real time. When receiving the POI information, the processor 180 may also receive an AR indicator corresponding to the POI.

The power supply unit 190 receives external power and internal power under the control of the processor 180 and supplies power necessary for the operation of each of components. The power supply unit 190 includes a battery, and the battery may be a built-in battery configured to be rechargeable, and may be detachably coupled to a terminal body for charging. The power supply unit 190 may include a connection port, and the connection port may be configured as an example of an interface 160 to which an external charger supplying power for charging a battery is electrically connected.

As another example, the power supply unit 190 may be configured to charge the battery in a wireless manner without using the connection port. In this case, the power supply unit 190 may receive power from an external wireless power transmitter by using at least one of an inductive coupling method based on a magnetic induction phenomenon or a magnetic resonance coupling method based on an electromagnetic resonance phenomenon.

Meanwhile, the mobile terminal 100 may include a computer-readable medium that executes a plurality of steps, when driven by the processor 180. The plurality of steps may include a step of receiving a front image, a step of calibrating the front image, and a step of driving an augmented reality navigation application so that an augmented reality navigation screen including at least one AR Graphic object and the calibrated front image is displayed on the display. The plurality of steps will be described in more detail with reference to FIG. 5.

FIG. 2 is a detailed block diagram of a processor according to an embodiment of the present disclosure.

FIG. 3 is a diagram referenced for explaining a navigation screen according to an embodiment of the present disclosure.

FIG. 4 is a diagram referenced for explaining an operation of generating a navigation screen according to an embodiment of the present disclosure.

Referring to the drawing, the processor 180 may include a navigation engine 210, an augmented reality AR engine 220, and a navigation application 230.

The navigation engine 210 may receive map data and GPS data. The navigation engine 210 may perform map matching based on the map data. and the GPS data. The navigation engine 210 may perform route planning. The navigation engine 210 may display a map and perform route guidance. The navigation engine 210 may provide route guidance information to the navigation application 230. Meanwhile, the navigation engine 210 may include a navigation controller 211. The navigation controller 211 may receive map matching data, map display data, and route guidance data. The navigation controller 211 may provide route data, point of interest (POI) data, and the like to the AR engine 220. The navigation controller 211 may provide route guidance data and a map display frame to the navigation application 230.

The AR engine 220 may include an adapter 221 and a renderer 222. The adapter 221 may receive front image data from the camera 121, first sensing data from a gyroscope sensor 143, and second sensing data from an acceleration sensor 144. According to an embodiment, the adapter may receive sensing data from at least one of a geomagnetic sensor, a temperature sensor, and a gravity sensor.

Based on data provided from a calibration factor DB, calibration for the front image may be performed. The AR engine 220 may perform object detection, based on the front image data and route data. The AR engine 220 may perform prediction and interpolation.

The rendered 222 may perform rendering based on root data, POI data, and prediction and interpolation result data. The rendered 222 may provide an AR graphical user interface (GUI) frame and an AR camera frame to the navigation application 230.

The navigation application 230 may generate an augmented reality navigation screen. As illustrated in FIG. 3, the augmented reality navigation screen may include a navigation map surface 310, an AR camera surface 320, an AR GUI surface 330, and a navigation GUI surface 340. The navigation application 230 may generate the navigation map surface 310, based on the map display frame provided from the navigation controller 211. The navigation application 230 may generate the AR camera surface 320, based on the AR camera frame provided from the renderer 222. The navigation application 230 may generate the AR GUI surface 330, based on the AR GUI frame provided from the renderer 222. The navigation application 230 may generate the navigation GUI surface 340, based on the route guidance data provided from the navigation controller 211.

Referring to FIG. 4, when the navigation application 230 is started (S410), the navigation application 230 may generate the navigation map surface 310, the AR camera surface 320, the AR GUI surface 330, and the navigation GUI surface 340 (S420). The navigation application 230 may provide the parameter of the AR camera surface 320 and the parameter of the AR GUI surface 330 to the AR engine 220 (S430). The AR engine 220 may register a callback function in the camera server 171 so as to receive front image data (S440). The camera server 171 may be considered to be included in the memory 170. The AR engine 220 may receive and crop the front image data (S450). The navigation application 230 may display the cropped front image on the AR camera surface 320 (S460). The AR engine 230 may perform AR (S470). The navigation application 230 may display the AR GUI on the AR GUI surface 330, based on the cropped front image (S480).

FIG. 5 is a flow chart according to an embodiment of the present disclosure.

A method of operating a mobile terminal (S500) will be described with reference to FIGS. 4 and 5. The mobile terminal 100 may provide an augmented reality navigation screen while being hold in a vehicle.

The processor 180 may receive a vehicle front image (S510). The camera 121 may photograph the vehicle front image. The processor 180 may receive the vehicle front image photographed by the camera 121. Step S510 may include step S511, step S512, and step S513.

The processor 180 may generate the AR GUI surface 330 and the AR camera surface 320 (S511). The processor 180 may obtain a camera 121 control and receive the vehicle front image (S512). The processor 180 may display the vehicle front image from the camera 121 on the AR GUI surface 330 and the AR camera surface 320 (S513).

The processor 180 may calibrate the vehicle front image (S520). Step S520 may include step S521, step S522, step S523, step S524, step S525, and step S526.

When calibration starts (S521), the processor 180 may detect and extract a vanishing line, a bonnet line, and a center line from the vehicle front image (S522 and S523). Data on the vanishing line, bonnet line, and center line extracted in step S523 may be stored in the calibration factor DB 172. The calibration factor DB 172 may be included in the memory 170. The processor 180 may calculate the height and tilt of the camera 121 (S524). For example, the processor 180 may calculate the height and tilt of the camera 121, based on the sensing data (e.g. first sensing data and second sensing data) (S524). The processor 180 may perform calibration for the vehicle front image, based on the data obtained in steps S523 and 8524 (S525). The processor 180 may terminate the calibration (S526).

The step of performing the calibration (S525) may include a step of cropping, by the processor 180, a first area in which at least a portion of the vehicle is located from the front image. At. least a portion of the vehicle may include at least one of a bonnet, a roof, an A-pillar, a dashboard, and a holder.

The step of performing the calibration (S525) may include a step of determining, by the processor 180, a balance of top, bottom, left and right of the front image, based on at least one of a horizontal line passing through a vanishing point detectable in the front image and a vertical line passing through the vanishing point, and a step of determining, by the processor, whether to use the wide-angle image, based on the balance.

Meanwhile, the method of operating a mobile terminal (S500) may include a step of overlaying the first AR graphic object on a point of the front image corresponding to the first object detected from the vehicle front image. The step of overlaying may be a sub-element of step S544.

The step of performing the calibration (S525) may include a step of determining, by the processor 180, whether to use the wide-angle image, based on the location of the first AR graphic object in the front image. The step of performing the calibration (S525) may include a step of positioning, by the processor 180, a left-right vanishing line detectable from the front image in the center of the vertical direction of the navigation screen.

The method. of operating a mobile terminal (S500) may further include a step of generating first sensing data by the gyroscope sensor 143 and a step of generating second sensing data by the acceleration sensor 144. The step of performing the calibration (S525) may further include a step of determines a holding tilt by the processor, based on the first sensing data and the second sensing data, and a step of compensating the holding tilt with respect to the navigation screen by the processor.

The processor 180 drive the augmented reality navigation application so that the augmented reality navigation screen 300 including at least one AR graphic object and the calibrated front image is displayed on the display 151 (S530). Step S530 may include steps S531 to S549.

Embodiment of Successful Calibration

The processor 180 may display the calibration result (S531). When it is determined that the calibration is successful (S532), the processor 180 may start the navigation mode after starting the AR mode (S533, S534). The processor 180 may search a route (S535). The processor 180 may receive and parse the route information (S536).

Meanwhile, the processor 180 may start sensor control (S540). The processor 180 may register various sensor data reception callbacks (S541). The processor 180 may receive and parse IMU sensor data. The IMU sensor includes the gyroscope sensor 143 and the acceleration sensor 144, and the processor 180 may receive the first sensing data and the second sensing data as IMU sensor data. The processor 180 may predict and interpolate the traveling of the vehicle, based on the parsing. result of step S546 and the parsing result of step S542 (S543). The processor 180 may display a maneuver on the AR GUI surface 330 (S544). The processor 180 may display an AR graphic object on the AR GUI surface 330. The processor 180 may overlay the first AR graphic object on a point of the front image corresponding to the first object detected in the front image through step S546. Thereafter, the processor 180 may guide a route (S537). The processor 180 may guide the route, based on the route searched in step S535 and the maneuver in step S544. The processor 180 may determine AR guidance and determine whether it is an AR guidance timing (S538, S539). When it is determined that it is the AR guidance timing, the processor 180 may perform step S544. When it is determined that it is not the AR guidance timing, the processor 180 may perform step S537.

The processor 180 may receive and parse the camera 121 sensor data (S546). The processor 180 may detect an object (e.g. a lane, other vehicle, a two-wheeled vehicle, a pedestrian, etc.) based on the image obtained by the camera 121. The processor 180 may recognize a lane, based on information on the detected object (S547). The processor 180 may cut the camera image (S548). The processor 180 may cut the front image, based on data stored in the calibration factor DB 172. The processor 180 may display a 3D carpet on the AR camera surface 320, based on the lane recognition data of S547 and the image data of S548 (S549).

Embodiment of Failed Calibration

The processor 180 may display the calibration result (S531). When it is determined that the calibration is failed (S532), the processor 180 may start the navigation mode without starting the AR mode (S534). The processor 180 may search a route (S535). The processor 180 may perform route guidance according to the searched route (S537).

FIGS. 6A and 6E are diagrams referenced for explaining a vanishing line, a bonnet line, and a center line according to an embodiment of the present disclosure.

Referring to the drawings, the processor 180 may detect a vanishing line 610, a bonnet line 620, and a center line 630 from a vehicle front image photographed by the camera 121. It may be defined as a horizontal line passing through the vanishing point 601 detected in the vehicle front image. The bonnet line 620 may be defined as a horizontal line passing through. an uppermost end of the bonnet detected in. the vehicle front image. The center line 630 may be defined as a vertical line passing through the vanishing point 601.

According to an embodiment, the processor 180 may perform calibration based on the vanishing line 610, the bonnet line 620, and the center line 630 in response to a user input. As illustrated in FIG. 6A, when the vanishing line 610, the bonnet line 620, and the center line 630 are set according to a user input, the processor 180 may calibrate the front image to be adjusted to the location set in each of the vanishing line 610, the bonnet line 620, and the center line 630.

FIGS. 7A to 7D are diagrams referenced for explaining a cropping operation according to an embodiment of the present disclosure.

As illustrated in FIG. 7A, the processor 180 may detect a vanishing line 710, a bonnet line 720, and a center line 730 from a vehicle front image photographed by the camera 121. As illustrated in FIG. 7B, the processor 180 may delete the area under the bonnet line 710 from the vehicle front image. The processor 180 may output navigation related information 740, on the area under the deleted bonnet line 710. For example, the processor 180 may display at least one of time information, location information, information. the road being driven, departure point information, departure time information, destination information, information of distance remaining to destination, information of time remaining to the destination, and estimated arrival time information, on the area under the bonnet line 710. The processor 180 may display a navigation. map 750 and a navigation GUI 755, on one area of the display 151.

As illustrated in FIG. 7C, the processor 180 may delete an unnecessary area from. the vehicle front image. The processor 180 may delete an object area that does not affect the driving of the vehicle. For example, the processor 180 may delete an area corresponding to a fixed object located in the sidewalk, from the vehicle front image. Thus, by deleting the object area that does not affect the driving of the vehicle, it is possible to prevent distraction during driving. As illustrated in FIG. 7D, the processor 180 may display the AR navigation screen 300.

FIGS. 8A and 8B are diagrams referenced for explaining a cropping operation according to an embodiment of the present disclosure.

As illustrated in FIG. 8A, the processor 180 may detect a holder line 810. The holder line 810 may be defined as a line formed in a vertical direction or a horizontal direction from a portion of the holder of the mobile terminal that protrudes most toward the center of the screen. As illustrated in FIG. 8B, the processor 180 may delete an area in which the holder is displayed around the holder line 810 in order to delete a holder 820.

FIGS. 9A to 11D are diagrams referenced for explaining an operation of using a wide-angle image according to an embodiment of the present disclosure.

Referring to the drawings, the camera 121 may include a first camera and a second camera. The first camera may obtain a front image of the vehicle. The second camera may obtain a wide-angle image in comparison with the first camera. In a deactivated state, the second camera may be activated when the processor 180 determines to use the wide-angle image.

The processor 180 may determine the balance of the top, bottom, left and right, based on the vanishing line 910 and the center line 920 in the front image. The processor 180 may determine whether to use the wide-angle image, based on the balance of the top, bottom, left and right. For example, when it is determined that the center line 920 is leaned toward the left of the front image, the processor 180 may activate the second camera. The processor 180 may supplement the front image of the first camera by taking an image outside the left side of the obtained image of the first camera from the image obtained by the activated second camera.

Meanwhile, when the vehicle 10 gradually approaches the intersection, the processor 180 may gradually enlarge and display the front image while gradually changing the angle of view of the first camera.

Meanwhile, the processor 180 may determine whether to use the wide-angle image, based on shape data of a road. For example, the processor 180 may determine whether to use a wide-angle image, based on curve data of a road formed to the left or right side.

Reference numeral 1010 of FIG. 10A illustrates a front image obtained by the first camera. Reference numeral 1020 illustrates a front. image obtained by the second camera. The processor 180 may overlay the first AR graphic object on a point of the front image corresponding to the first object detected in the front image. The processor 180 may determine whether to use the wide-angle image, based on the location of the first AR graphic object in the front image. As illustrated in FIG. 10B, when the route is formed to the right so that the AR graphic object 1030 is located in the right side of the front image, the processor 180 may supplement the front image of the first camera by obtaining a right area that deviates from the front image of the first camera among the wide-angle images of the second camera. In this case, as illustrated in FIG. 10C, when using a wide-angle image, the processor 180 may combine and display a portion of the front image of the first camera and the wide-angle image of the second camera, by reducing a scale in comparison with a scale before using the wide-angle image. Alternatively, the processor 180 may process and display only the wide-angle image of the second camera. In this case, the processor 180 may maintain the size of the front area display area. As illustrated in FIG. 10D, when using a wide-angle image, the processor 180 may combine and display a portion of the front image of the first camera and the wide-angle image of the second camera, by making a scale to be equal to a scale before using the wide-angle image. Alternatively, the processor 180 may process and display only the wide-angle image of the second camera. In this case, the processor 180 may increase the size of the display area of the front area. The processor 180 may reduce the navigation map display area.

Reference numeral 1110 of FIG. 11A illustrates a front image obtained by the first camera. Reference numeral 1120 illustrates a front image obtained by the second camera. The processor 180 may overlay the first AR graphic object on a point of the front image corresponding to the first object detected in the front image. The processor 180 may determine whether to use the wide-angle image, based on the location of the first AR graphic object in the front image. As illustrated in FIG. 11B, when the route is formed to the left so that the AR graphic object 1130 is located in the left side of the front image, the processor 180 may supplement the front image of the first camera by obtaining a left area that deviates from the front image of the first camera among the wide-angle images of the second camera. In this case, as illustrated in FIG. 11C, when using a wide-angle image, the processor 180 may combine and display a portion. of the front image of the first camera and the wide-angle image of the second camera, by reducing a scale in comparison with a scale before using the wide-angle image. Alternatively, the processor 180 may process and display only the wide-angle image of the second camera. In this case, the processor 180 may maintain the size of the front area display area. As illustrated in FIG. 11D, when using a wide-angle image, the processor 180 may combine and display a portion of the front image of the first camera and the wide-angle image of the second camera, by making a scale to be equal to a scale before using the wide-angle image. Alternatively, the processor 180 may process and display only the wide-angle image of the second camera. In this case, the processor 180 may increase the size of the display area of the front area. The processor 180 may reduce the navigation map display area.

FIGS. 12A. and 12B are diagrams referenced for explaining an operation of adjusting a vanishing line according to an embodiment of the present disclosure.

Referring to the drawings, the processor 180 may detect a vanishing line 1210 from a front image. As illustrated in FIG. 12A, the processor 180 may determine whether the vanishing line 1210 is positioned below the center 1220 in the vertical direction of the navigation screen. In this case, the processor 180 may adjust an area displayed on the navigation screen of the front image so that the vanishing line 1210 is positioned in the center 1220. As illustrated in FIG. 12B, the processor 180 may position the vanishing line 1210 in the center 1220 of the navigation screen in the vertical direction.

The processor 180 may determine whether the vanishing line is positioned above the center of the navigation screen in the vertical direction. In this case, the processor 180 may position the vanishing line in the center of the navigation screen in the vertical direction.

FIGS. 13A to 13C are diagrams referenced for explaining an operation of compensating a tilt value when a vehicle according to an embodiment of the present disclosure travels on a slope.

As illustrated in FIGS. 13A and 13B, when the vehicle travels on a flat ground, the processor 180 may configure a lookup table 1310 by calculating a tilt value of the mobile terminal and calculating a vanishing line. The lookup table 1310 may be stored in the memory 170. For example, when the tilt of the mobile terminal 100 is 90 degrees, 85 degrees, 80 degrees, and 75 degrees, each vanishing line may be calculated to configure the lookup table 1310.

As illustrated in FIGS. 13C and 13D, when the vehicle travels on a slope, the processor 180 may compensate the installation tilt value of the mobile terminal 100, based on the lookup table 1310. For example, the processor 180 may determine that the installation tilt value of the mobile terminal 100 is 75 decrees, based on at least one of the first sensing data and the second sensing data. The processor 180 may check that the value of the vanishing line is 540. The processor 180 may determine that the tilt value of the mobile terminal corresponding to the vanishing line value is 90 degrees based on the lookup table 1310. The processor 180 may compensate the installation tilt of the mobile terminal 100 as 90 degrees when the vehicle travels on a slope.

FIGS. 14A to 14C are diagrams referenced for explaining an operation of a mobile terminal in a specific situation according to an embodiment of the present disclosure.

FIG. 14A illustrates a case where an AR navigation application is driven in a foreground. Foreground driving of the AR navigation application can be identically explained with a description described with reference to FIGS. 1 to 13C.

FIG. 14B illustrates a case in which an AR navigation application is driven in the foreground in a state where the camera is deactivated. The operating method of the mobile terminal 100 may further include a step of obtaining vehicle stop state information by the processor 180, a step of deactivating the camera 121 by the processor 180, and a step of driving the augmented reality navigation application to display a navigation screen excluding the front image and the AR graphic object by the processor 180.

When obtaining the vehicle stop state information, the processor 180 may deactivate the camera, and drive the augmented reality navigation application to display a navigation screen excluding the front image and the AR graphic object. In the AR navigation screen, the processor 180 may configure the AR navigation screen by including only the navigation GUI surface and the navigation map surface while excluding the AR GUI surface and the AR camera surface.

Meanwhile, the operating method of the mobile terminal 100 may further include a step of obtaining vehicle moving state information after the vehicle stop state by the processor 180, a step of activating the camera by the processor 180, and a step of calibrating the front image obtained from the activated camera 121, based on the calibration data prior to deactivation of the camera 121, by the processor 180.

When obtaining the vehicle moving state information after the vehicle stop state, the processor 180 activates the camera 121, and may calibrate the front image obtained from the activated camera 121, based on the calibration data prior to deactivation of the camera 121. The processor 180 may calibrate the front. image obtained from the activated camera 121 by calling calibration data from the calibration factor DB 172.

FIG. 14C illustrates a case where the AR navigation application is driven in a background. The operating method of the mobile terminal 100 may include a step of receiving at least one of a home button input signal and other application execution input signal by the processor 180, a step of deactivating the camera 121 by the processor 180, and a step of driving the augmented reality navigation application in the background by the processor 180.

When receiving at least one of a home button input signal and other application execution input signal, the processor 180 may deactivate the camera 121, and drive the augmented reality navigation application in the background.

FIG. 15 is a diagram referenced for explaining an operation of a mobile terminal in a walking mode according to an embodiment of the present disclosure.

Referring. to FIG. 15, the mobile terminal 100 may be used in a vehicle mode and a walking mode. When the mobile terminal 100 is used in the vehicle mode, the mobile terminal 100 operates as described with reference to FIGS. 1 to 14.

When the mobile terminal 100 is used in a walking mode, the processor 180 may provide an AR navigation screen for walking. The processor 180 may perform calibration so that an area of an object that does not interfere with walking is excluded from a pedestrian front image. The processor 180 may enlarge and display an area for guiding a pedestrian in the pedestrian front image, and delete the remaining area.

The present disclosure described above can be implemented as a computer-readable code on a medium on which a program is recorded. The computer-readable medium includes all types of recording devices that store data that can be read by computer system. Examples of computer-readable media include hard disk drives (HDDs), solid state disks (SSDs), silicon disk drives (SDDs), ROMs, RAM, CD-ROMs, magnetic tapes, floppy disks, optical data storage devices, etc. There are also carrier waves (for example, transmission over the Internet). In addition, the computer may include a processor or a processor. Therefore, the detailed description above should not be construed as restrictive all respects and should be considered as illustrative. The scope of the present disclosure should be determined by rational interpretation of the appended claims, and all changes within the equivalent scope of the present disclosure are included in the scope of the present disclosure.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of generating an augmented reality (AR) image, the method comprising:
   receiving, by at least one processor, a front image for detecting (i) an object in front of a vehicle and (ii) a wide-angle image having a wide angle compared to the front image;
   detecting, by the at least one processor, the object in the front image; and
   overlaying, by the at least one processor, an AR graphic object on the wide-angle image based on the object detected in the front image,
   wherein overlaying the AR graphic object comprises:
      overlaying the AR graphic object on the wide-angle image, on a point of the front image corresponding to the object detected in the front image, and
      overlaying, based on the AR graphic object being outside an area of the front image, the AR graphic object on the wide-angle image.

2. The method of claim 1, further comprising:
   controlling, by the at least one processor, a display to display an AR navigation screen including information of the wide-angle image and the AR graphic object.

3. The method of claim 1, further comprising:
   controlling, by the at least one processor, a display to display an AR navigation screen including information of the front image, information of the wide-angle image, and the AR graphic object.

4. The method of claim 1, further comprising:
   detecting a calibration factor data from the front image; and
   calibrating, by the at least one processor, the front image based on the calibration factor data, and
   wherein calibrating the front image comprises:
      determining an area to be cropped from the front image, based on the calibration factor data, and
      cropping the determined area from the front image.

5. The method of claim 1, further comprising:
   detecting a calibration factor data from the front image; and
   calibrating, by the at least one processor, the front image based on the calibration factor data, and
   wherein calibrating the front image comprises:
      determining a balance of the front image based on the calibration factor data, and
      calibrating the front image based on the balance of the front image.

6. A mobile terminal configured to provide an augmented reality (AR) navigation screen, the mobile terminal comprising:
   a display; and
   at least one processor configured to:
      receive a front image for detecting (i) an object in front of a vehicle and (ii) a wide-angle image having a wide angle compared to the front image,
      detect the object in the front image based on the front image, and
      overlay an AR graphic object on the wide-angle image based on the object detected in the front image,
   wherein overlaying the AR graphic object on the wide-angle image comprises:
      overlaying the AR graphic object on the wide-angle image, on a point of the front image corresponding to the object detected in the front image, and
      overlaying, based on the AR graphic object being outside an area of the front image, the AR graphic object on the wide-angle image.

7. The mobile terminal of claim 6, wherein the processor is configured to control the display to display the AR navigation screen including information of the wide-angle image and the AR graphic object.

8. The mobile terminal of claim 6, wherein the processor is configured to control the display to display the AR navigation screen including information of the front image, information of the wide-angle image, and the AR graphic object.

9. The mobile terminal of claim 6, wherein the processor is configured to:
   detect a calibration factor data from the front image, and
   calibrate the front image based on the calibration factor data, and
   wherein calibrating the front image comprises:
      determining an area to be cropped from the front image, based on the calibration factor data, and
      cropping the determined area from the front image.

10. The mobile terminal of. claim 6, wherein the processor is configured to:
   detecting a calibration factor data from the front image, and
   calibrating the front image based on the calibration factor data, and
   wherein calibrating the front image comprises:
      determining a balance of the front image based on the calibration factor data, and
      calibrating the front image based on the balance of the front image.

* * * * *